US010771337B1

(12) United States Patent
Das et al.

(10) Patent No.: US 10,771,337 B1
(45) Date of Patent: Sep. 8, 2020

(54) CONTROLLING PERMISSIONS FOR REMOTE MANAGEMENT OF COMPUTING RESOURCES

(71) Applicant: Amazon Technologies, Inc., Seattle, WA (US)

(72) Inventors: Munindra N. Das, Redmond, WA (US); Patrick McFalls, Seattle, WA (US); Amjad Hussain, Bellevue, WA (US); Anantharam Vaidyanathan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 15/989,836

(22) Filed: May 25, 2018

(51) Int. Cl.
| | |
|---|---|
| *G06F 15/173* | (2006.01) |
| *H04L 12/24* | (2006.01) |
| *H04L 12/911* | (2013.01) |
| *H04L 29/06* | (2006.01) |
| *G06F 9/455* | (2018.01) |

(52) U.S. Cl.
CPC ...... *H04L 41/0893* (2013.01); *G06F 9/45512* (2013.01); *H04L 41/5096* (2013.01); *H04L 47/70* (2013.01); *H04L 63/102* (2013.01); *H04L 63/104* (2013.01); *H04L 63/083* (2013.01)

(58) Field of Classification Search
CPC . H04L 41/0893; H04L 41/5096; H04L 47/70; H04L 63/102; H04L 63/104; H04L 63/083; G06F 9/45512
See application file for complete search history.

(56) References Cited

U.S. PATENT DOCUMENTS

| | | | | |
|---|---|---|---|---|
| 2011/0307544 A1* | 12/2011 | Lotlikar | ................. | G06F 9/468 709/203 |
| 2016/0112497 A1* | 4/2016 | Koushik | ................. | H04L 67/10 726/7 |
| 2017/0017779 A1* | 1/2017 | Huang | ................. | G06F 40/106 |
| 2018/0054352 A1* | 2/2018 | Chefalas | ................. | G06F 9/50 |

* cited by examiner

*Primary Examiner* — Sm A Rahman
(74) *Attorney, Agent, or Firm* — Lee & Hayes, P.C.

(57) ABSTRACT

This disclosure describes techniques for defining a set of permissions, or privileges, for users who manage resources of a network-based service provisioned in a network-based service platform managed by a service provider. The techniques may include mapping cloud identities of the users to operating system (OS) user groups defined local to the resources that specify the set of permissions for user group members. Systems-manager agents that execute locally on the resources may determine to which OS user group the user belongs based on their cloud identity, and launch shells that are restricted by the set of permissions. Using these shells, a network-based service platform may allow users to remotely manage resources of the network-based service in various ways, such as through batch run commands and/or remote user sessions, while ensuring that the users are unable to execute commands on the resources that are outside the set of permissions.

23 Claims, 11 Drawing Sheets

CONTROLLING PERMISSIONS FOR REMOTE MANAGEMENT OF COMPUTING RESOURCES

BACKGROUND

Service providers offer network-based services to fulfill users' computing-service needs without the users having to invest in and maintain computing infrastructure required to implement the services. These service providers may provide network-based computing resources and functionality to implement various types of services, such as scalable-storage services, computer-processing services, application-platform services, and so forth. In some examples, developers may utilize application-platform services offered by the service provider to run their applications using virtual servers (or "instances") provisioned on various configurations of hardware-based resources of a network-based service platform. Overtime, developers of applications that are supported by these network-based, application-platform services may desire to make changes or modifications to their applications and/or computing resources.

Service providers may allow developers that use services to manage instances and/or resources of their network-based services. For example, developers may be allowed manage their resources by adding instances, removing instances, and/or modifying instances, such as by executing workloads on the instances. The techniques and technologies described herein provide, among other things, improvements to how developers manage instances running applications, and/or computing resources supporting the instances, in a network-based service platform.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
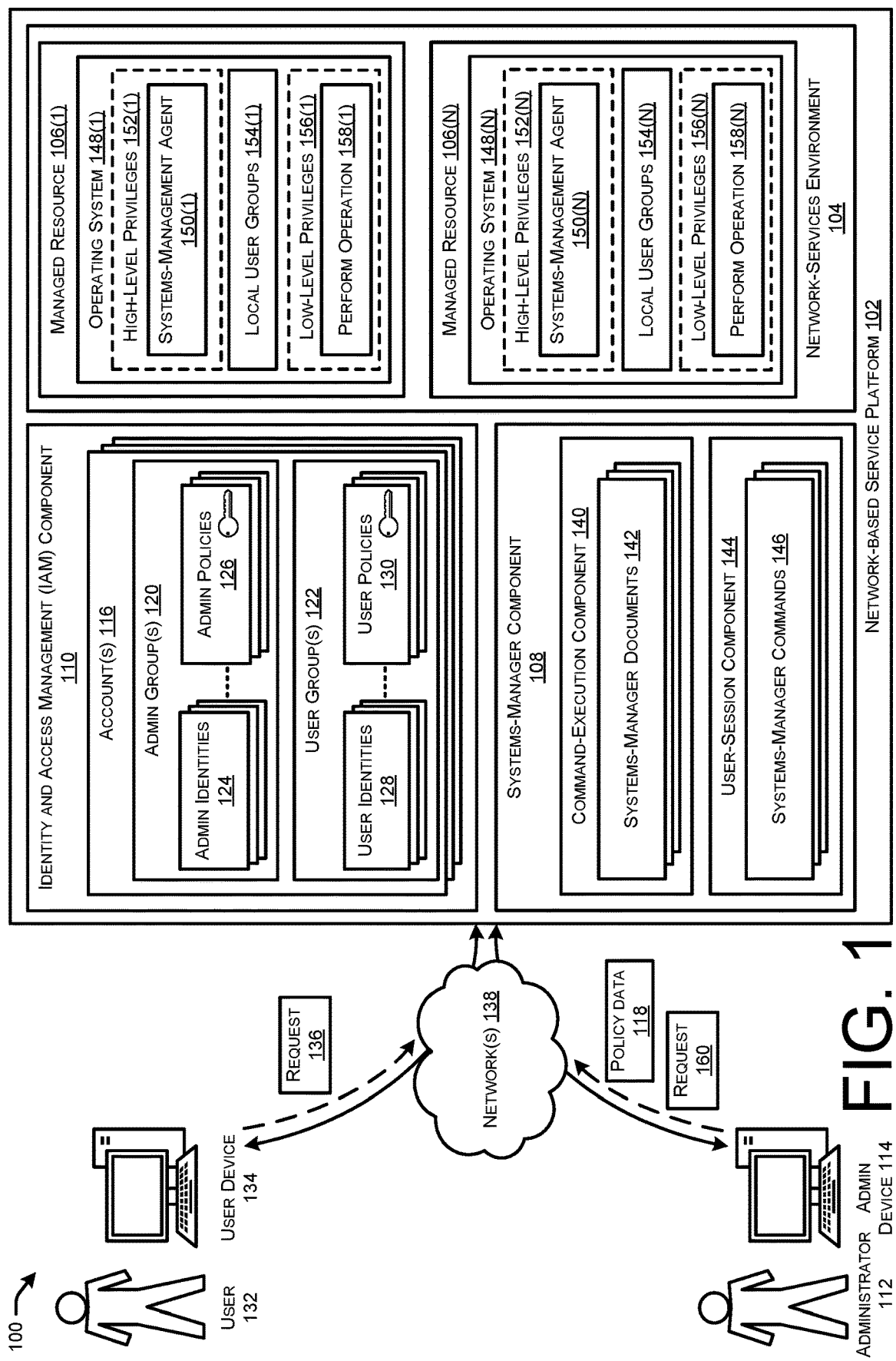
FIG. 1 illustrates a system-architecture diagram of an example environment in which a network-based service platform controls the privileges and/or permissions of a user for remotely managing one or more managed resources of a network-based service.

Service providers offer various network-based services to users to fulfill computing needs of the users. These service providers may operate clusters of managed servers stored in data centers located across large geographic areas. In this way, users of the network-based services do not need to invest in and maintain the computing infrastructure required to implement the various services that they may need. Additionally, users are able to access, or provide to their clients, these network-based services over large geographic areas.

Service providers may offer various types of network-based services, such as application-platform services that provide, among other features, application-hosting or container environments. For example, a developer may subscribe to application-platform services to host their applications on virtual-machine instances, often referred to herein as "managed instances" or simply "instances," that are in turn supported by various combinations of hardware-based resources (e.g., CPU, memory, storage, network capacity, etc.). These instances may each have their own operating system to run the developer's application, and may be scalable to support increased or decreased demand. The service providers may allow developers to remotely manage their application-based services that are provisioned in network-based platforms of the service provider (e.g., cloud-based computing environments, network-based service architectures, network-based service infrastructures, etc.). For example, developers may be allowed to manage specific instances, and/or groupings of instances, as their applications and/or computing needs evolve over time. Similarly, developers may be allowed to manage all resources of their network-based services, including software-based resources, hardware-based resources, firmware-based resources, etc.

To enable developers to manage resources supporting their application-based services, service providers may utilize a systems-manager component to provide an interface that in turn provides developers with a complete view of the infrastructure for the resources of their application-based services, and also to centralize management of the resources of their application-based services. Often, applications are not developed and managed by a single person or "user," but require a team of users that develop and/or manage different portions of the application-based services. To effectively manage resources of the application-based services, these different users may each be permitted to make changes to the resources and/or applications supported by the application-based services. Thus, service providers may also provide an identity and access management (IAM) component to securely manage which users are able to access the systems-manager component to modify or otherwise manage the application and/or the resources supporting the application. However, depending on the types of management being performed by the different users, the different duties of the users, and/or the different management privileges of the users (e.g., account administrator versus a lower-level user), subscribers to the application-based services may wish to provide different privileges to different users with respect to what types of management functions are permitted to the different users.

This disclosure describes techniques for defining permissions or privileges of users who manage resources of a network-based service (e.g., applications executing on virtual machines), that are provisioned in a network-based service platform provided by a service provider. The techniques may include mapping, or otherwise associating, cloud identities of users who manage network-based applications, and/or other network-based resources, to operating system (OS) user groups that are defined locally to managed resources and/or instances of the network-based applications. The OS user groups may be associated with, or granted, various sets of permissions or privileges that restrict and/or allow the users to perform various management operations for the resources, such as executing a command. As a specific example, a cloud identity for an administrator account of a network-based service may be mapped to local OS user groups on managed instances that are assigned high-level privileges (e.g., a root account for a Unix-based OS, an administrator account for a Windows-based OS, etc.). Conversely, a user account for a network engineer of the network-based service may be mapped to a local OS user group that restricts the types of permissions or privileges of the network engineer to executing commands for managing network resources of the network-based service. Generally, the techniques described herein are applicable to resources, or managed resources, that are provisioned in and/or support a network-based service. As described herein, managed resources may include hardware-based resources (e.g., memory, CPU, network resources, etc.), managed instances or other virtual-server resources (e.g., operating systems), a partitioned resource with an operating system, application-container resources, and/or any other type of resource that may be managed according to different privileges or permission levels.

In some examples, an administrator of an account for a network-based service may define what users (e.g., which of their employees) are able to manage their network-based service. To securely manage which users have access to the network-based service and associated resources, each of the users may be provided with sign-in credentials for the IAM component of the network-based service. In this way, an administrator of the network-based service is able to create and manage users, and define user permissions to allow and deny their access to the network-based service. Using the sign-in credentials, the users (e.g., application-software engineers, network engineers, etc.) that are permitted by an administrator account to manage the network-based service and associated resources are able to interface with the systems-manager component of the network-based service platform. The systems-manager component may provide an interface to allow the users to centralize operational data and automate tasks, and also provide a complete view of the infrastructure of the network-based service and associated resources. Thus, authorized users may be permitted to manage resources, such as virtual machines running applications, of the network-based service by, for example, performing operations such as running commands on one or more resources of the network-based service.

In some examples, the network-based service may include a few managed resources, or a fleet of managed resources, that may comprise virtual machines with operating systems executing thereon. To manage these resources, the network-based service provider may install a systems-manager agent, often referred to herein as an "agent," that executes commands or otherwise performs operations on the respective resources based on requests received from the users. For example, the systems-manager component may allow the users to select documents, or workloads, which specify commands that are to be sent to a particular resource, and/or a fleet of resources, to allow the user to remotely and securely manage the configuration of their resources. The documents may specify commands such as installing software, running ad hoc scripts, configuring operating system settings, installing a patch, and so forth. The agents installed local to each of the resources may receive data indicating the requested command, and execute the command on the resource to satisfy the request of the user.

However, the agents that run on each of the resources may interact with the operating systems of the resources with a relatively high permission level or privileges (e.g., root account for a Unix-based OS, administrator account for Windows-based OS, etc.). While this may be advantageous for situations where an administrator account for the network-based service would like to make high-privilege changes to the resources, the administrators of the network-based service may desire to restrict the permissions or privileges that are afforded to the users who are permitted to make changes to the resources as well.

In some examples, policies may be defined for users who are provided with sign-in credentials to manage resources of a network-based service to restrict permissions of those users. For example, administrator accounts (or other entities) may define a policy that is associated with a cloud identity of the user where the policy defines the permissions that the user has for managing resources of the network-based service. As an example, the policies may indicate a name of a resource, or a name of a grouping of resources (e.g., a "tag"), and a name of a user group to which the particular cloud identity is mapped. The name of the user group for the cloud identity may correspond to user groups that are defined locally on the managed resources themselves, and indicate the permissions that members of the user group have when interacting with the operating system on the managed resource. For instance, certain operating systems may have built-in groups, such as root, administrator, standard user, guests, etc., for Linux operating systems, and system, administrator, and users for Windows operating systems. However, other types of user groups may be utilized or defined with associated permissions. Thus, the cloud identities of users that are authorized to manage resources of a network-based service may be associated with an account policy that maps the cloud identities to locally defined user groups for operating systems of the managed resources.

Once a user signs in using their sign-in credentials, the systems-manager component may determine that the user is requesting to manage one or more resources of a network-based service, such as by executing a command. The systems-manager component may provide various avenues by which the user is able to manage the resources. For example, the user may be permitted to run commands in a "batch" process where a fleet of resources receive the same command to be executed. In other examples, the user may be permitted to engaged in an interactive remote user session (e.g., Secure Shell (SSH), Windows PowerShell, remote desktop connection, etc.) and provide commands to the operating system of a resource using a shell executing on the operating system. In either example, or in any other type of command execution example, the commands may be executed according to, and within the restrictions of, the permissions afforded to that user by the locally defined user group.

Once the user has requested to manage one or more resources, such as by executing a command, the systems-manager component may provide an indication of the user group to which the user belongs to the agent(s) running on the resources that the user has requested to manage. The agents may check that the user is in fact part of the locally defined user group, and may execute the commands according to permissions of that locally defined OS user group. In the example of the batch-command request, each of the agents running on the resources requested to be managed may launch a shell, and log into the shell, that interacts with the respective operating systems according to the defined set of permissions. In this way, the commands requested from the user are unable to be executed on the resources if they attempt to perform operations that are restricted by the set of permissions. In the example of the remote user session where the user has requested to manage a particular resource, the agent may similarly launch a shell on the resource that interacts with the operating system according to the set of permissions for the user. The user may then have a more interactive session on the managed resource using the shell and via the remote user session, but still be restricted as to the types of commands the user is permitted to execute based on the local OS user group. In some examples, other types of methods may be utilized to allow a user to perform commands and/or other operations according to a set of permissions. For instance, rather than utilizing a shell, the user may utilize a remote desktop connection and run with a lower-level set of permissions. In this way, the user may perform operations under lower-level privileges that the higher-level privileges under which the agent performs operations.

In this way, network-based service platforms may map the cloud identities of users of network-based services who are permitted to manage resources to locally defined OS user groups on the managed resources. Rather than having high-privilege agents execute commands on the resources that may result in an operation being performed that the user should not be permitted to execute, the agent may launch shells on the operating systems according to the set of permissions afforded to the user based on the OS user group(s) to which the user belongs.

The techniques described herein affect and improve the operations of computing devices in various ways. Previously, an agent might perform operations, such as executing commands, on a resource for a user that results in operations being performed that are outside of the privileges of the user. For example, an administrator of an account may define a workload document that the user is permitted to execute. However, that workload document may include a mistake that causes an operation to be performed that was not intended by the administrator. Thus, the user may perform an operation, such as executing a command that is outside the privileges that are designated by the administrator for that user. However, by mapping a cloud identity of the user to local OS user groups with permissions, and executing commands in a shell that is launched on a resource according to the set of permissions, the user is unable to execute commands outside of the allocated privileges. In another example, an administrator may simply wish to perform a low-level command on a resource (e.g., collecting data), and accidently execute a high-level command that requires effort to fix or resolve (e.g., rolling back an application version). Thus, it may be advantageous to utilize the techniques described herein to allow the administrator to launch a shell, or otherwise restrict the privileges that a user executes operations under, according to different user groups depending on the requested command. These and other examples are just a few of how the techniques described herein improve the ability of network-based service platforms to control permissions or privileges of users that manage network-based services provisioned in the network-based service platform.

While some of the techniques described herein are with reference to managing permissions of users that are performing operations such as commands on managed resources of a network-based service, the techniques are equally applicable to any technique for remotely managing resources where OS user groups may be defined. Further, there may be other types of management means outside of batch commands and/or remote user session where the described techniques may be applicable. Generally, the techniques may be equally applicable to the management of resources where permissions may be defined, such as by using OS user groups, to restrict commands that are permitted for users managing the resources. Some of the techniques described herein are with reference to specific components or system architectures, but these descriptions are exemplary, and the techniques are equally applicable using different components and/or architectures. There are various types of operations that may be performed according to the privilege-defining techniques described herein, such as executing a plug-in, executing a command, managing hardware-based resources such as memory, and or any other type of operation that may be performed according to a set or privileges or permissions.

Further, while the techniques are described herein with respect to operating systems, the techniques are equally applicable to any type of secondary identity system. For example, the cloud identities provided by a service provider (or other type of identity management service) may be a primary identity service. The techniques described herein harness the identity of a user of a primary identity service, and map that identity (e.g., cloud identity) to local identities of a secondary identity service for resources. In some examples, the secondary identity service may comprise a user account for an operating system, but the secondary identity service may comprise any type of identity service.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a network-based service platform 102 controls the privileges and/or permissions of a user for remotely managing one or more managed resources of a network-based service.

Generally, the network-based service platform 102 may comprise a secure network-based (e.g., cloud-based) services platform that offers various resources to users, such as compute power, database storage, content delivery and other functionality. Another service that the network-based service platform 102 may provide is an application-based service, such as application hosting. The network-based service platform 102 may include a network-services environment 104 to host one or more managed resources 106 for a network-based service, a systems-manager component 108 to allow users to manage their network-based service(s), and an identity and access management (IAM) component 110 to allow users to manage access to their network-based services and resources securely. Generally, the network-services environment 104 may comprise a network of hardware-based components that support managed resources 106 of a network-based service. The network-services environment 104 may comprise various combinations of central processing units, memory, storage, network capacity, and/or any other type of hardware-based resource to support network-based services. In some examples, the network-services environment 104 may further include firmware-based and/or software-based resources that are available to entities with network-based services provisioned in the network-services environment.

As illustrated, an administrator 112 may utilize an admin device 114 (e.g., user device, client device, etc.) to create one or more accounts 116 utilizing an interface exposed by the IAM component 110 (or another component). Upon registering an account 116 with the network-based service platform 102 via the IAM component 110, the administrator 112 may further provide policy data 118 to the IAM component to configure who can access their account(s) 116, and what types of permissions are to be given to different users that are able to access and/or manage the network-based service of the administrator 112. For example, the administrator 112 may provide policy data 118 that defines one or more admin groups 120, which generally correspond to entities who are able to manage the network-based service with less restrictions (e.g., higher privileges and/or permissions), and one or more user groups 122, which generally correspond to users who are able to manage the network-based service with more restrictions (e.g., lower privileges and/or permissions). For example, administrators included in the admin group(s) 120 may be allowed to perform higher-level management operations for their network-based service, such as installing new versions of applications on the managed resources 106, installing patches for software executing on the managed resources 106, etc. Conversely, users included in the user group(s) 122 may be allowed to perform lower-level management operations, such as reading data from the managed resources, executing commands on certain types of resources, etc.

The admin group(s) 120 may include admin identities 124 (e.g., cloud identities, network-based identities, etc.), which generally correspond to admin profiles, admin accounts, etc. The admin identities 124 may be uniquely assigned for each administrator 112 on the account(s) 116. For example, each administrator 112 may be provided with, or associated with, separate sign-in credentials that they use to sign-in to the IAM component 110. The IAM component 110 may be able to determine the admin identity 124 for the administrator 112 based on the sign in credentials. The policy data 118 may further specify one or more admin policies 126 for the admin identities 124. For example, the admin identities 124 may each be associated with a respective admin policy 126, or a single admin policy 126 may govern all of the admin identities 124. As described in more detail below, the admin policies 126 may generally map, or otherwise associate, each admin identity 124 with the managed resources 106 of the network-based service, and also local user groups for operating systems of the managed resource 106.

Similarly, user group(s) 122 may include user identities 128 (e.g., cloud identities, network-based identities, etc.), which generally correspond to user profiles, user accounts, etc., and associated user policies 130. As described herein, a user 132 may generally correspond to a person who is permitted to manage resources 106 of the network-based service, but who may not have the same set of privileges or permissions as an administrator 112. In some examples, a user 132 may have their privileges restricted based on their job duties. For example, a network engineer may be restricted to managing network resources of the network-based service, whereas a software engineer may be restricted to managing software executing on the managed resources 106. The user identities 128 may be uniquely assigned for each user 132 on the account(s) 116. For example, each user 132 may be provided with, or associated with, separate sign-in credentials that provide, using a client device 134, to the IAM component 110 to sign-in to the IAM component 110. The IAM component 110 may be able to determine the user identity 128 for the user 132 based on the sign in credentials. The policy data 118 may further specify the user policies 130 for the user identities 128. For example, the user identities 128 may each be associated with a respective user policy 130, or a single user policy 130 may govern all of the user identities 128. As described in more detail below, the user policies 130 may generally map, or otherwise associate, each user identity 128 with the managed resources 106 of the network-based service, and also local user groups for operating systems of the managed resource 106.

Once the administrator 112 finished registering and configuring their account(s) 116, users 132 may submit various requests 136 (e.g., work requests, remote user session requests, etc.), using their user devices 134 and via a wired and/or wireless network 138, to manage the network-based service platform 102. As briefly described above, a user 132 may be able to manage the resources 106 in various ways. For example, once the user 132 has signed-in via the IAM component 110 using their sign-in credentials, the systems-manager component 108 may be utilized by the user 132 to manage their network-based services.

The systems-manager component 108 may generally be a unified interface that allows users 132 to centralize operation data and perform tasks across the network-based resources for the user 132. The systems-manager component 108 may provide the user 132 with a complete view of the network-based resources infrastructure performance and configuration, simply resource and application management, and allows the user 132 to operate and manage the infrastructure of their network-based resources at scale. In the specific example of FIG. 1, the systems-manager component 108 may provide the user 132 with a means to manage their resources 106 that are provisioned in the network-services environment 104.

In some examples, the systems-manager component 108 may include a command-execution component 140 which allows the user 132 to remotely and securely manage the configuration of their managed resources 106. For instance, the command-execution component 140 may allow the user 132 to automate common administrative tasks and/or perform ad hoc configuration changes at scale to a fleet of managed resources 106. For instance, the command-execution component 140 may allow users 132 and/or administrators 112 to perform various tasks on their managed resources 106, such as installing or bootstrapping applications, building a deployment pipeline, capturing log files when a resource 106 is terminated from an auto-scaling group, and join instances to an OS domain.

The systems-manager component 108 may define systems-manager documents 142 (referred to herein as documents 142) which enable users 132 to quickly perform common tasks on the managed resources 106. Generally, a document 142 may comprise a description of work, or a command, that is sent to the managed resource 106 to be executed on the managed resource 106. The documents 142 may define actions that are to be performed on the managed resources 106 using various languages such as JavaScript Object Notation (JSON) or YAML. Thus, the user 132 may provide an indication of a document 142 that the user 132 would like to execute on one or more of the managed resources 106. The managed resources 106 may comprise any number of managed resources 106(1) through 106(N) (collectively referred to as "managed resources 106"), wherein "N" is any integer greater than two. In some examples, the managed resources 106(N) may comprise a fleet of resources that each receive a same document 142 indicating a command or other workload to be performed on each of the managed resources 106(N). In this way, the user 132 may request that the command-execution component 140 cause each of the managed resources 106 to execute one or more workloads or commands defined by the documents 142.

In various examples, the systems-manager component 108 may include a user-session component 144 which allows the user 132 to remotely and securely manage the configuration of their managed resources 106 via a remote user session. Generally, the user-session component 144 may be utilized to establish an interactive session between the user device 134 and a managed resource 106 to enable the user 132 to interactively execute commands on the managed resource 106. In some examples, the user-session component 144 may utilize a software package that implements a secure communication protocol (e.g., Secure Shell (SSH), Windows PowerShell, remote desktop connection, etc.) to securely manage the resources 106, such as by enabling file transfers over the networks 138. In this way, the user 132 may, via their user device 134, engage in an interactive session via the user-session component 144 and execute various systems-manager commands 146 to manage the resources 106.

The managed resources 106 may comprise any machine (e.g., virtual machines, hardware-based machines, etc.), configured for the systems-manager component 108. The managed resources 106, or on-premise machines in a hybrid environment, may be each include respective operating systems 148 (e.g., 148(1)-148(N)) to support the managed resource's 106 basic functions and operations. Although Unix-based operating systems (e.g., Linux) and Windows-based operating systems are discussed herein, any type of operating system 148 may be installed and operating on the managed resources 106. Each of the managed resources 106 may have a respective systems-management agent 150 (referred to herein as "agent 150") executing on the operating system 148. In some examples, the agents 150 may comprise software that runs on the managed resources 106 and/or hybrid instances that process requests/commands from the systems-manager component 108 and configures the managed resource 106 according to the requests/commands. The agents 150 may operate or run under high-level privileges 152 to ensure that the agents 150 are able to perform all the requests received from the systems-manager component 108. In some examples, the agents 150 may operate under the high-level privileges 152 by executing in a shell, and in other examples, the agents 150 may run commands or perform operations independent of a shell and according to high-level privileges.

In some examples, the systems-management agent 150 may not be running or operating locally on each resource 106. For instance, the systems-management agent 150 may comprise a management layer that is not running on the resources 106 themselves, but is running on one or more other machines while performing management functions for the managed resources 106. As an example, the systems-management agent 150 may comprise a management layer which, for containers, run on a host rather than the container itself. As another example, the systems-management agent 150 may comprise a management layer that, for storage resources, may be in another cloud/network-based service platform 102. Thus, in some examples, each of the managed resources 106 may have a systems-management agent 150 running locally on the resource 106, and in other examples the systems-management agent 150 may comprise a management layer that is running on a separate resource, but manages the managed resources 106.

As described above, administrators 112 may wish to restrict the permissions or privileges of users 132 that are able to manage the resources 106. In some examples, the high-level privileges 152 may correspond to a root account for a Unix-based OS, an administrator account for a Windows-based OS, etc. Thus, the users 132 may submit requests that detail which resources 106 they would like to manage, an indication of the means by which they would like to manage their resources 106 (e.g., remote user session, batch execution, etc.), and potentially an indication of the type of management (e.g., indication of a document 142). The systems-manager component 108 may then provide indications to the appropriate agents 150 of the requests/commands (e.g., documents 142) submitted from the user 132, as well as other information for the user 132, such as a user identity 128. The managed resources 106 may each include local user groups 154 which may comprise groupings of users 132 that are granted, or otherwise associated with, sets of permissions or privileges that restrict and/or allow the users to perform various management operations for the resources 106, such as executing a command. The local user groups 154 may be defined locally to each managed resource 106, and indicate permissions that the users 132 have when interacting with the operating systems 148 of the managed resources 106. The local user groups 154 may be built-in groups for different operating systems 148, such as root, administrator, standard user, guests, etc., for Linux operating systems 148, and system, administrator, and users for Windows operating systems 148. However, other types of user groups may be utilized or defined with associated permissions. For example, the administrator 112 and/or an operating of the network-based service platform 102 may define local user groups 154 and also define the sets of permissions for members of the defined local user groups 154.

Similarly, the local user groups 154 need not necessarily be defined local to the managed resources 106. In some examples, the user groups 154 may be defined in another directory system that is separate from the IAM component 110. For instance, the IAM component 110 may store the accounts 116, and the user groups 154 that define the permissions may be defined in a secondary IAM system or directory. In such examples, the managed resources 106 may be configured to consult the secondary system or directly to determine the user groups 154 and the associated permissions.

The agents 150 may determine which local user group 154 is appropriate for the user 132 based on their user identity 128. In some examples, the systems-manager component 108 may provide an indication (e.g., group name) to the agent 150 of the appropriate local user group 154, and in other examples, the agent 150 may determine the appropriate local user group 154 based on a mapping between the user identity 128 and appropriate local user group 154. Upon determining the appropriate local user group 154 for the user 132, the agents 150 may launch, run, execute, or otherwise perform operation using low-level privileges 156 that allow management of the resources 106 according to the set of permissions granted to the user 132 in the local user groups 154. The low-level privileges 156 may allow performance of an operation 158 (e.g., command execution, plug-in execution, etc.) requested by the user 132. The low low-level privileges 156 may, in some examples, be in the form of shells that comprise a user interface that provides access to the services of the operating system 148. The shells may comprise operating systems shells that use, for example, a command-line interface (CLI), a graphical-user interface (GUI), etc., by which the user 132 and/or the agent 150 performs the operation 158. The low-level privileges 156 of the shells may refrain from executing commands that are not permitted for members of the associated local user group 154, and may allow the shells to execute commands that are permitted by the associated local user group 154.

Performing operations according to the low-level privileges 156 and the high-level privileges 152 may comprise, in some examples, executing commands in a shell, performing a request within the security context of the privileges 152 and/or 156, executing an operation using a process that performs the operations according to the privileges 152 and/or 156, and so forth.

In some examples, the user 132 may interact directly with the managed resources 106 according to the low-level privileges 156 using their user device 134 and via a remote user session provided by the user-session component 144. For instance, the user may have an interactive, remote user session with a managed resource 106 and execute commands according to the low-level privileges 156 to manage the resources 106. In other examples, agents 150 on each of the managed resources 106 may perform operations according to the low-level privileges 156, receive indications of operations that are requested to be performed by the user 132 (e.g., documents 142), and execute the operations/commands or other workloads using the low-level privileges 156. In this way, when users 132 who request operations or commands to be performed or executed on managed resources 106, or otherwise request a modification for the resources 106, the agent 150 may perform the commands using a lower set of permissions or privileges for the user 132 rather than the high-level privileges 152 at which the agent 150 operates.

The agent 150 may launch shells according to the low-level privileges 156, and/or high-level privileges 152, using various techniques. In an example techniques, the agent 150 may determine which local user group 154 the user 132 belongs based on a mapping between the user identity 128 and the local user group 154. The agent 150 may then identify and/or create a local user name on the operating system 148 of the managed resource 106 for the user 128. Upon creating and/or identifying a local user name for the user 132 on the operating system 148, the agent 150 may reset a password for the local user name to a new password. The agent 150 may then utilize the local user name and the new password to log into the launched shell at the low-level privileges 156. In this way, either the agent 150 itself may execute commands in the shell at the low-level privileges 156, or allow the user 132 to interact with the operating system 148 via the shell at the low-level privileges 156. Thus, rather than the user 132 recalling a local user name or password for the operating systems 148 of the managed resources 106, the agent 150 may dynamically create/identify a local user name, and dynamically determine, create, and/or reset a password for the local user name.

In some examples, the administrator 112 may perform similar operations as the user 132 to manage the resources 106. For example, the administrator 112 may utilize their admin device 114 to send a request 160 to the network-based service platform 102. Based on the sign-in credentials of the administrator 112, the IAM component 110 may determine that the administrator is included in an admin group 120 with an admin identity 124 and a corresponding admin policy 126. Depending on how the administrator 112 requested to interact with the managed resources 106 (e.g., batch execution of commands, interactive remote user session, etc.), the systems-manager component 108 may instruct the agent 150 to launch a shell on the managed resource(s) 106 to allow the administrator 112 to manage their resources 106. Depending on what local user group 154 the admin identity 124 maps to on the managed resource 106, the agent 150 may execute at low-level privileges 156 or at high-level privileges 152 through which the administrator 112 manages their resources 106.

Although illustrated as being permissions for operating systems 148, the high-level privileges 152 and/or low-level privileges 156 may be associated with a different program and/or with managing other resources. For example, the privileges 152/156 may define permissions or privileges for managing hardware-based resources and/or other types of software besides an operating system. In this way, the techniques described herein may utilize privileges 152/156 to define permissions for managing any type of resource.

Figure 2:
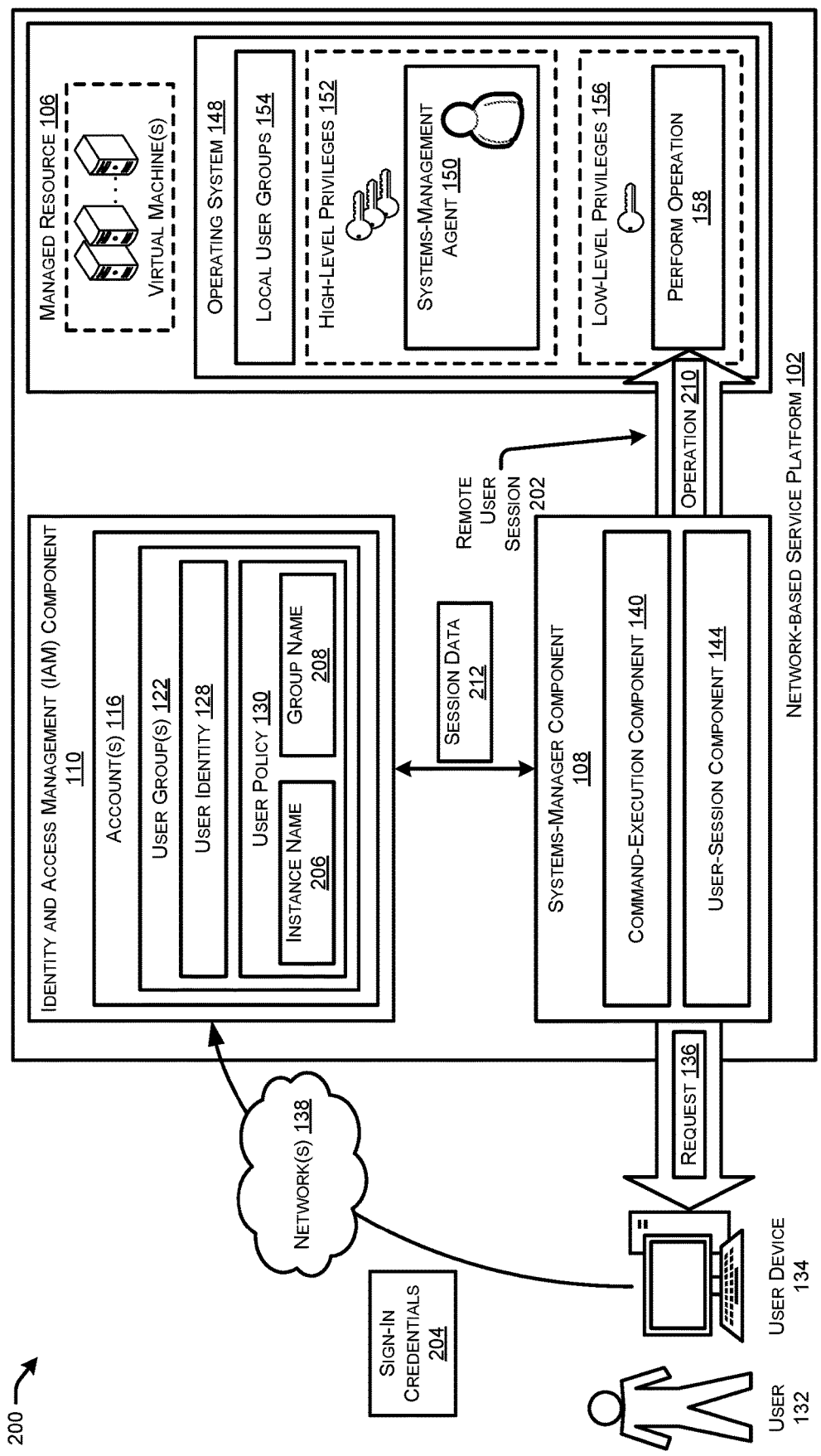
FIG. 2 illustrates a system-architecture diagram of an example environment in which network-based service platform is configured to control the privileges and/or permissions of a user engaged in a remote user session for remotely managing a resource in a network-based service.

FIG. 2 illustrates a system-architecture diagram of an example environment 200 in which network-based service platform 102 is configured to control the privileges and/or permissions of a user 132 engaged in a remote user session 202 for remotely managing a resource 106 of a network-based service.

As illustrated in FIG. 2, the user 132 may utilize their user device 134 to log into the IAM component 110 by sending their sign-in credentials 204 over the network(s) 138 to the network-based service platform 102. Using the sign-in credentials 204, the IAM component 110 may determine an account 116 for the user 132, as well as the user group 112 that indicates the user identity 128 and corresponding user policy 130 that has been defined for the user 132. The user policy 130 may indicate mappings between the user identity 128, resource names 206 for the managed resources 106, and group names 208 for the local user groups 154 stored or defined on the managed resources 106. For example, the sign-in credentials 204 may be utilized to determine a user identity 128 of the user 204 (e.g., cloud identity), which is then mapped to resource names 206 that the user identity 128 is permitted to manage, and is further mapped to group names 208 indicating the local user groups 154 for the manage resource 106 to which the user 132 belongs.

Upon signing in using the IAM component 110, the user may submit a request 136 to the systems-manager component 108 to engage in a remote user session 202 with a managed resource 106. The request 136 may indicate the manage resource(s) 106 with which the user 132 would like to have a remote user session 202, and may further include an indication of a type of operation 210 that the user 132 would like to perform on the managed resource 106. The systems-manager component 108 may obtain session data 212 via the IAM component 110, such as the resource name 206, group name 208, etc. The user-session component 144 of the systems-manager component 108 may then establish the remote user session 202 with the appropriate managed resource 106 based on the resource name 206, which may be indicated in the request 136. The systems-manager component 108 may further provide the group name 208 for the user identity 128 to the agent 150. The agent 150 may utilize the group name 208 to determine to which local user group 154 the user 132 belongs. For instance, the group name 208 to which the user identity 128 is mapped may correspond to a local user group 154 on the managed resource 106. The agent 150 may then launch a shell according to low-level privileges 156 based on a set of permissions for the local user group 154. The user 132 is then able to interact according to the low-level privileges 156 via their user device 134 over the remote user session 202 (e.g., SSH, Microsoft PowerShell, etc.). The user 132 is then able to perform the operation 158 using their user device 134 in the shell at the low-level privileges 156. If the operation 210 is permitted by the low-level privileges 156, the operating system 148 may perform the operation 210. Alternatively, if the operation 210 is not permitted by the low-level privileges 156, then the low-privilege shell may restrict or prevent the operating system 148 from performing the operation 210 (e.g., execute a command).

The remote user session 202 may comprise any type of session by which a user is able to remotely manage the managed resource 106, such as SSH, a remote desktop connection, or any other remote session by which a user may interact with the managed resource 106.

Figure 3:
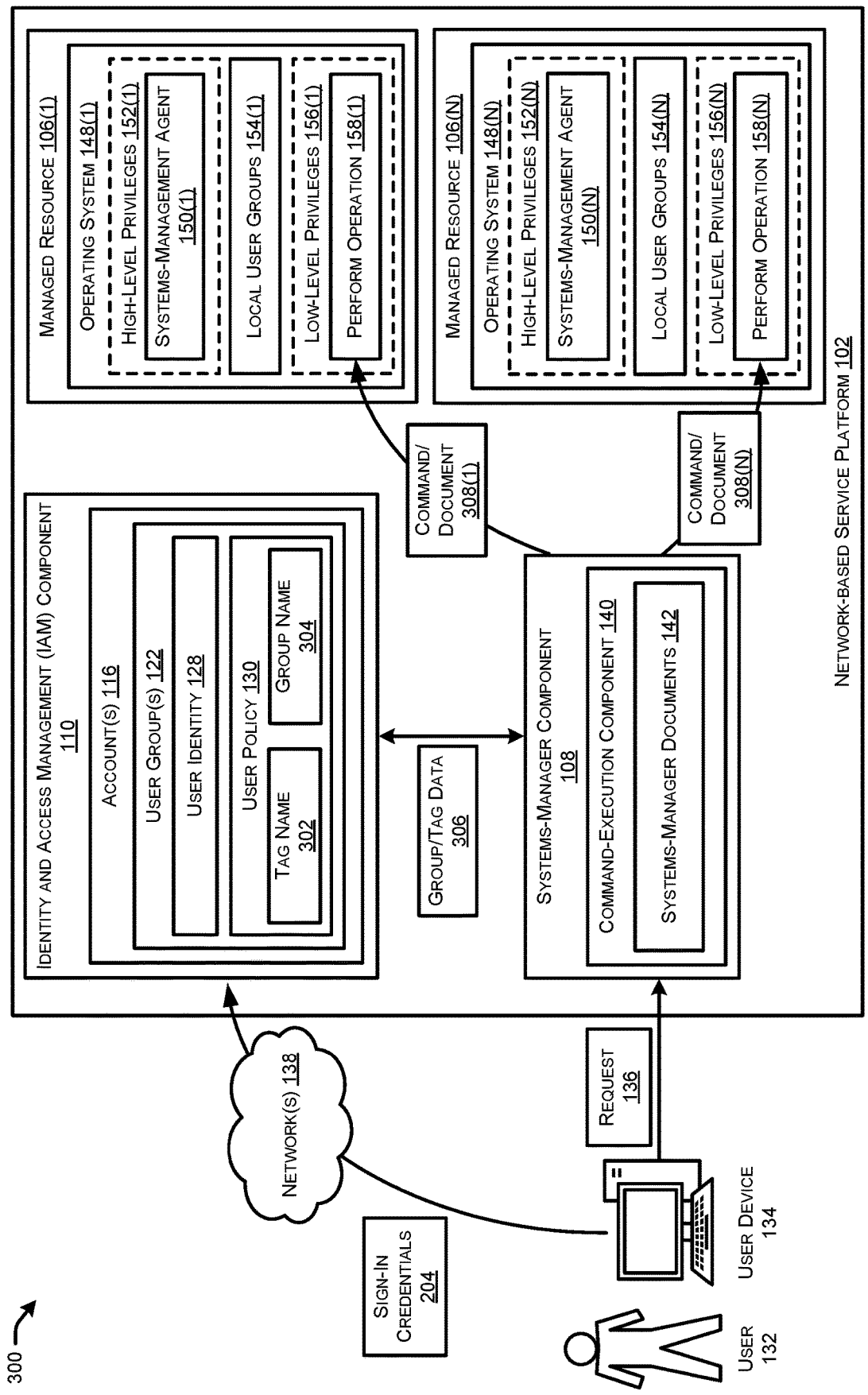
FIG. 3 illustrates a system-architecture diagram of an example environment in which network-based service platform is configured to control the privileges and/or permissions of a user requesting a batch-management operation for remotely managing multiple resources in a network-based service.

FIG. 3 illustrates a system-architecture diagram of an example environment 300 in which network-based service platform 102 is configured to control the privileges and/or permissions of a user 132 requesting a batch-management operation for remotely managing multiple resources 106(1)-106(N) of a network-based service.

As illustrated in FIG. 3, the user 132 may utilize their user device 134 to log into the IAM component 110 by sending their sign-in credentials 204 over the network(s) 138 to the network-based service platform 102. Using the sign-in credentials 204, the IAM component 110 may determine an account 116 for the user 132, as well as the user group 112 that indicates the user identity 128 and corresponding user policy 130 that has been defined for the user 132. The user policy 130 may indicate mappings between the user identity 128, tag names 302 indicating groupings for the managed resources 106, and group names 304 for the local user groups 154 stored or defined on the managed resources 106. For example, the sign-in credentials 204 may be utilized to determine a user identity 128 of the user 204 (e.g., cloud identity), which is then mapped to tag names 302 of resource groupings that the user identity 128 is permitted to manage, and is further mapped to group names 304 indicating the local user groups 154 for the manage resources 106 to which the user 132 belongs. The tag names 302 may group managed resources 106 based on various data. For example, an administrator 112 may assign the tag name 302 to managed resources 106 they wish to have grouped, the tag name 302 may group managed resources 106 based on the managed resources 106 having the same operating system (s), the tag name 302 may group managed resources 106 based on the managed resources 106 being a same type of resource 106, and/or any other grouping for the managed resources 106.

The tag names 302 may indicate groupings of managed resources 106. Rather than having explicit resource names 206, the tag names 302 may allow administrators 112 to define groupings of resources 106 that may be mapped to the same set of privileges via the group names 304. In this way, rather than having to edit the user policy 130 for each user 132 when resources 106 are added and/or removed, the tag names 302 may be edited by the administrator 112, which in turn updates the list of resources 106 that the user 132 is permitted to manage. For example, a tag name 302 may correspond to a grouping of resources 106 that correspond to web servers. In this way, a web administrator 112 may be granted a set of permissions for a tag name 302 that correspond to web servers, but may be restricted from other resources 106 that are not included in the resource grouping for the tag name 302 for the web servers.

Upon signing in using the IAM component 110, the user may submit a request 136 to the systems-manager component 108 to run commands on a batch of resources 106 using the command-execution component 140. The request 136 may indicate the document(s) 142 that the user 132 is requesting be executed on the managed resources 106. The systems-manager component 108 may then obtain the tag name 302 and group name 304 from the user policy 130 of the IAM component 110. The systems-manager component 108 may determine that the tag name 302 includes managed resources 106(1)-(N), and may send data indicating the command/documents 308(1)-(N) to each of the managed resources 106(1)-(N). The respective agents 150(1)-(N) may then launch a shell according to the low-level privileges 156(1)-(N) based on a set of permissions for the local user groups 154 associated with the group name 304. The agents 150(1)-(N) may then perform an operation 158(1)-(N) based on the commands/documents 308(1)-(N) in the respective shells at the low-level privileges 156(1)-(N). In this way, the user 132 may utilize their user device 134 to perform a batch execution of commands on a group of managed resources 106 that are grouped according to a tag name 302 indicated in the user policy 130.

Although the description of FIGS. 2 and 3 are described with reference to the user 132, the techniques are equally applicable to the administrator 112, in which case the commands may be performed in different privilege shells, such as a shell at the high-level privileges 152.

Figure 4A:
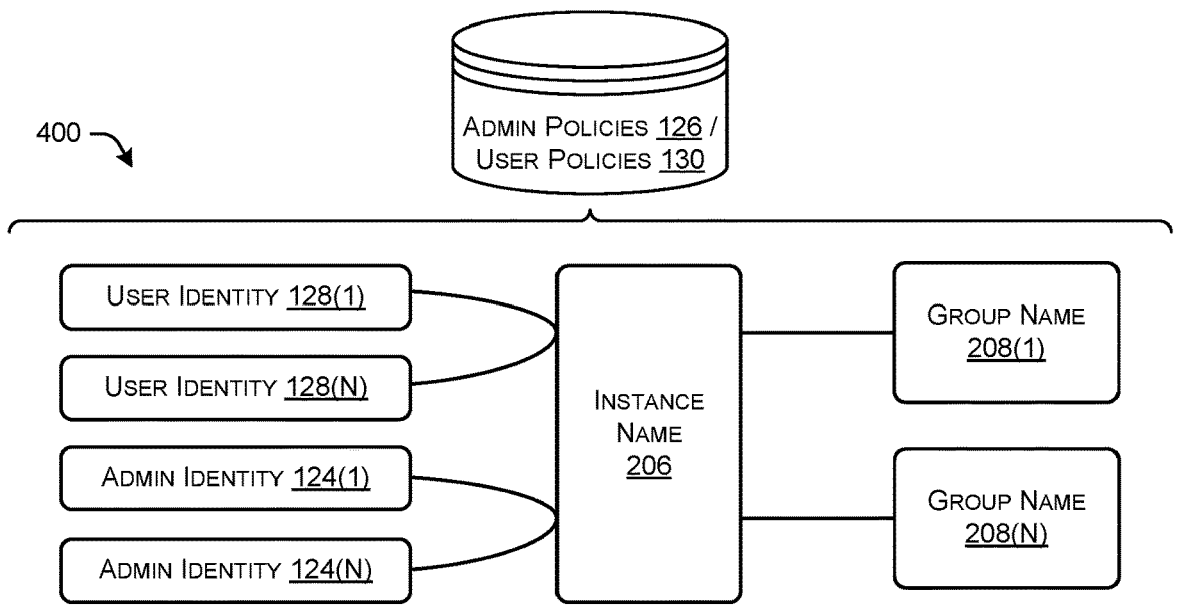
FIG. 4A illustrates example mappings between cloud identities of users of a network-based service, resource names, and group names for user groups defined locally on the resources.

FIG. 4A illustrates example mappings 402 between cloud identities of users of a network-based service, resource names, and group names for user groups defined locally on the resources.

As shown, the user policies 130 define mappings 400 between the user identities 128(1)-(N) and a resource name

206. For example, the user policies 130 may include an association stored in memory between the user identities 128(1)-(N) and resource names 206 for resources 106 that the respective users 132 are permitted to manage. In this way, the systems-manager component 108 may determine, using the IAM component 110, which resources 106 the users 132 are permitted to manage. Further, the resource name 206 may be mapped to a group name 208(1) for the user identities 128(1)-(N). Thus, the resource name 206 may indicate the resource(s) 106 that users 132 of the user identities 128(1)-(N) are permitted to managed, and the resource name 206 may be mapped to a group name 208(1) for that indicates the local user group 154 that define the set of permissions for the user 132 when managing the resource 106.

Similarly, the admin policies 126 define mappings 400 between the admin identities 124(1)-(N) and a resource name 206. For example, the admin policies 126 may include an association stored in memory between the admin identities 124(1)-(N) and resource names 206 for resources 106 that the respective administrators 112 are permitted to manage. In this way, the systems-manager component 108 may determine, using the IAM component 110, which resources 106 the admins 112 are permitted to manage. Further, the resource name 206 may be mapped to a group name 208(N) for the admin identities 124(1)-(N). Thus, the resource name 206 may indicate the resource(s) 106 that admins 112 of the admin identities 124(1)-(N) are permitted to managed, and the resource name 206 may be mapped to a group name 208(N) for that indicates the local user group 154 that define the set of permissions for the admins 112 when managing the resource 106.

Figure 4B:
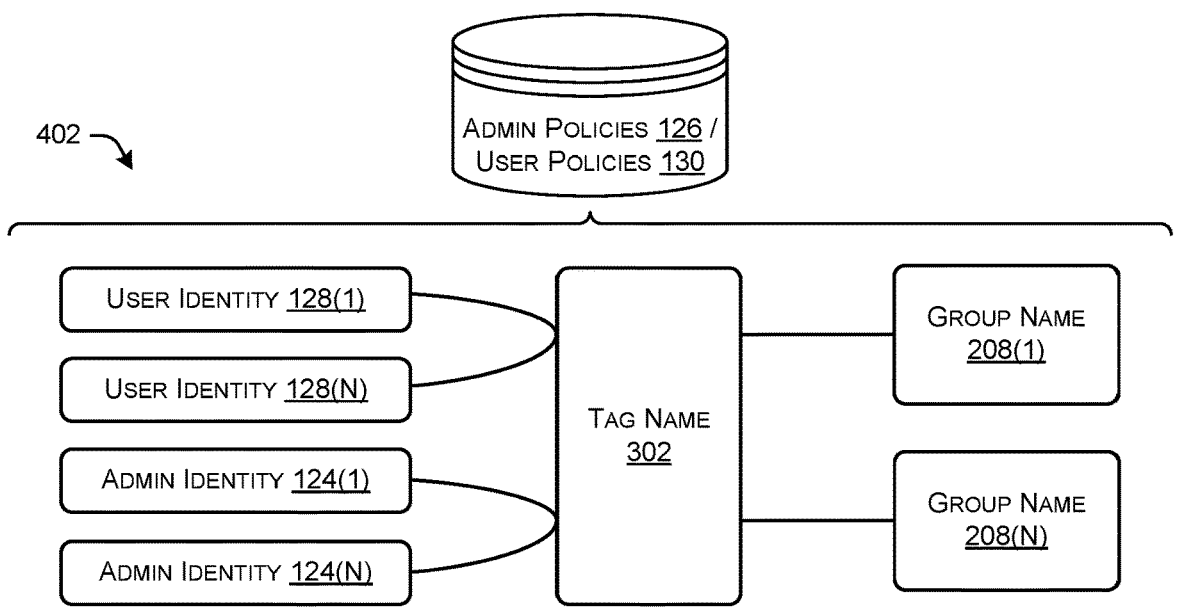
FIG. 4B illustrates example mappings between cloud identities of users of a network-based service, tag names for a group of resources, and group names for user groups defined locally on the resources.

FIG. 4B illustrates example mappings 402 between cloud identities of users of a network-based service, tag names for a group of resources, and group names for user groups defined locally on the resources.

As shown, the user policies 130 define mappings 402 between the user identities 128(1)-(N) and a tag name 302. For example, the user policies 130 may include an association stored in memory between the user identities 128(1)-(N) and the tag name 302 which indicates groupings of resources 106 that the respective users 132 are permitted to manage. By grouping resources 106 using the tag name 302 may, the tag names 302 may allow administrators 112 to define groupings of resources 106 that may be mapped to the same set of privileges via the group names 304 rather than having explicit resource names 206. Rather than having to define individual resources 106 that a user 132 is permitted to manage, the tag names 302 may indicate groupings of resources 106 with a single name that the user 132 is permitted to manage. Further, resources 106 may be added and/or removed from the grouping of resources 106 that the tag name 302 indicates, which may be more easily managed than having to edit each user policy 130 when a resource 106 the user is permitted to manage is removed or added from the network-services environment 104. For example, a tag name 302 may correspond to a grouping of resources 106 that correspond to web servers. In this way, a web administrator 112 may be granted a set of permissions for a tag name 302 that correspond to web servers, but may be restricted from other resources 106 that are not included in the resource grouping for the tag name 302 for the web servers.

Using the mapping between the user identities 128(1)-(N) and the tag name 302, the systems-manager component 108 may determine, using the IAM component 110, which resources 106 the users 132 are permitted to manage. Further, the tag name 302 may be mapped to a group name 208(1) for the user identities 128(1)-(N). Thus, the tag name 302 may indicate the resource(s) 106 that users 132 of the user identities 128(1)-(N) are permitted to managed, and the tag name 302 may be mapped to a group name 208(1) that indicates the local user group 154 that define the set of permissions for the user 132 when managing the resources 106 included in the grouping corresponding the tag name 302.

Similarly, the admin policies 126 define mappings 400 between the admin identities 124(1)-(N) and a tag name 302. For example, the admin policies 126 may include an association stored in memory between the admin identities 124(1)-(N) and a tag name 302 for groupings of resources 106 that the respective administrators 112 manage. In this way, the systems-manager component 108 may determine, using the IAM component 110, which groupings of resources 106 the admins 112 are permitted to manage. Further, the tag name 302 may be mapped to a group name 208(N) for the admin identities 124(1)-(N). Thus, the group name 302 may indicate the group of resource(s) 106 that admins 112 of the admin identities 124(1)-(N) are permitted to managed or would like to manage, and the tag name 302 may be mapped to a group name 208(N) for that indicates the local user group 154 that define the set of permissions for the admins 112 when managing the resources 106.

In some examples, one or more tag names 302 may be received as input from the user device 134 and/or the admin device 114 in order to identify what resources 106 the user 132 and/or administrator 112 would like to manage. The tag names 302 may indicate names of the groupings of resources 106 that are used by the command-execution component 140 when performing a batch management operation on all of the resources 106 in the grouping that correspond to the tag names 302.

Figure 5:
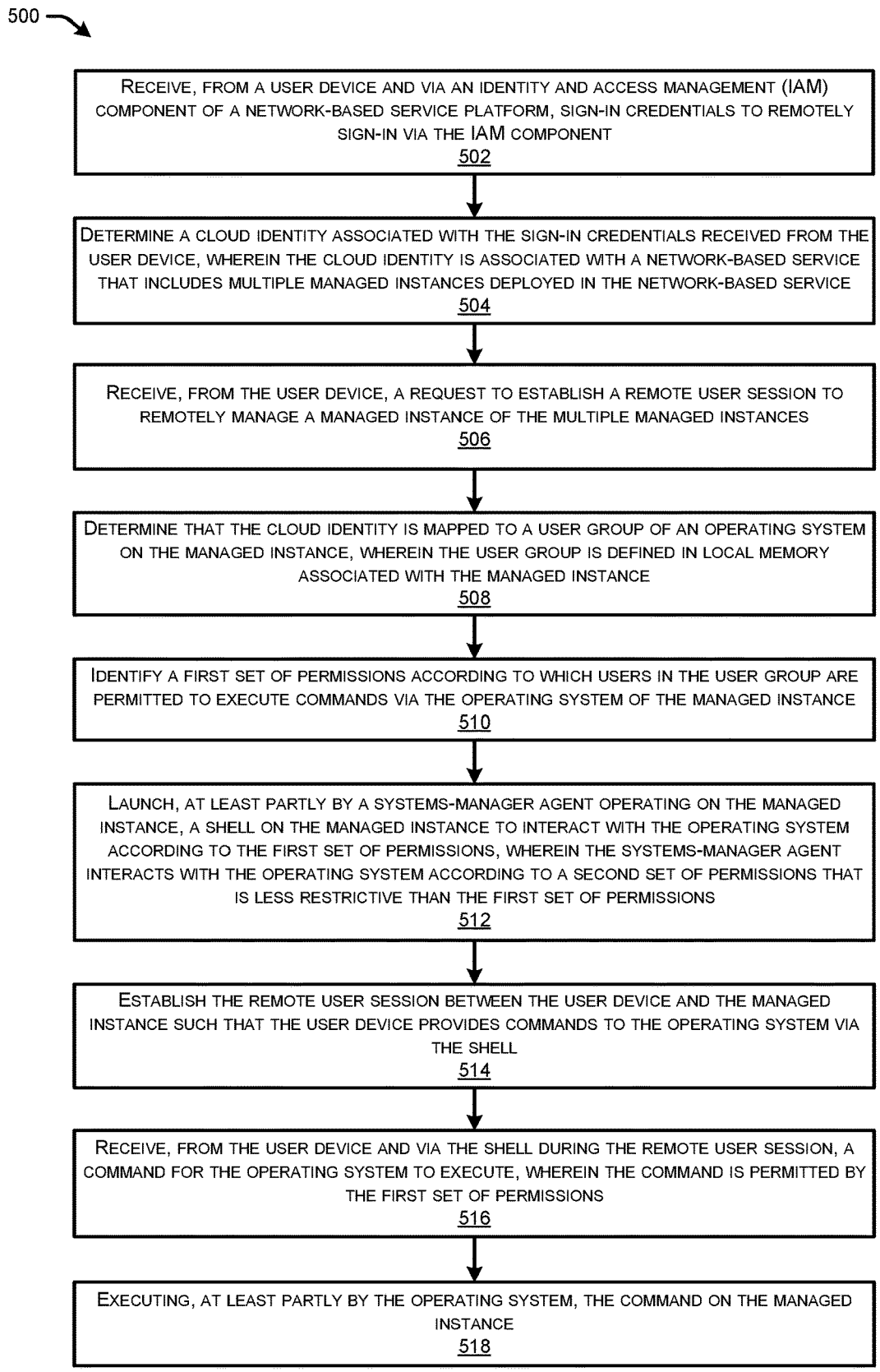
FIG. 5 illustrates a flow diagram of an example method for controlling the privileges and/or permissions of a user engaged in a remote user session for remotely managing a resource of a network-based service.
Figure 6:
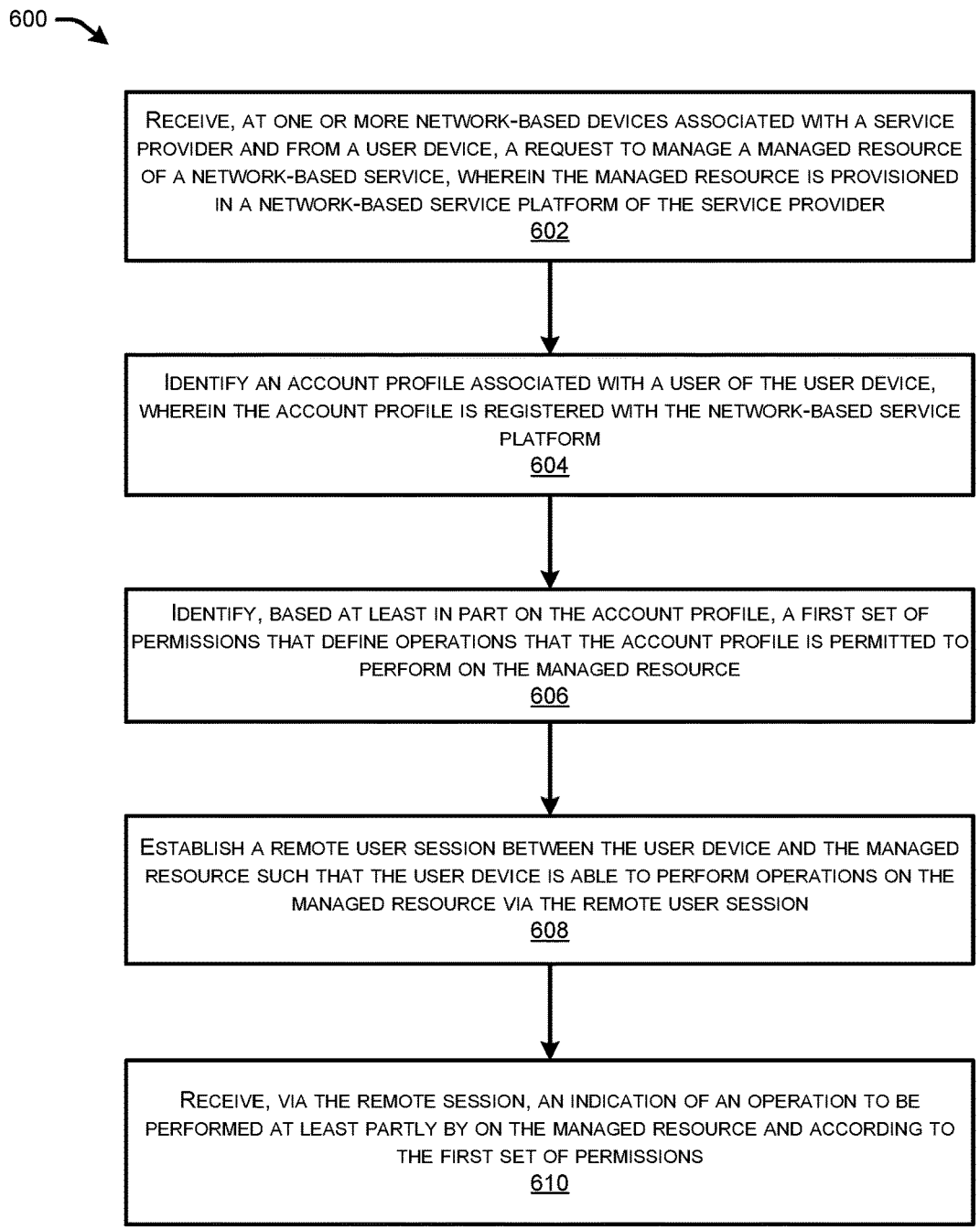
FIG. 6 illustrates a flow diagram of an example method for controlling the privileges and/or permissions of a user requesting a batch-management operation for remotely managing multiple resources of a network-based service.
Figure 7:
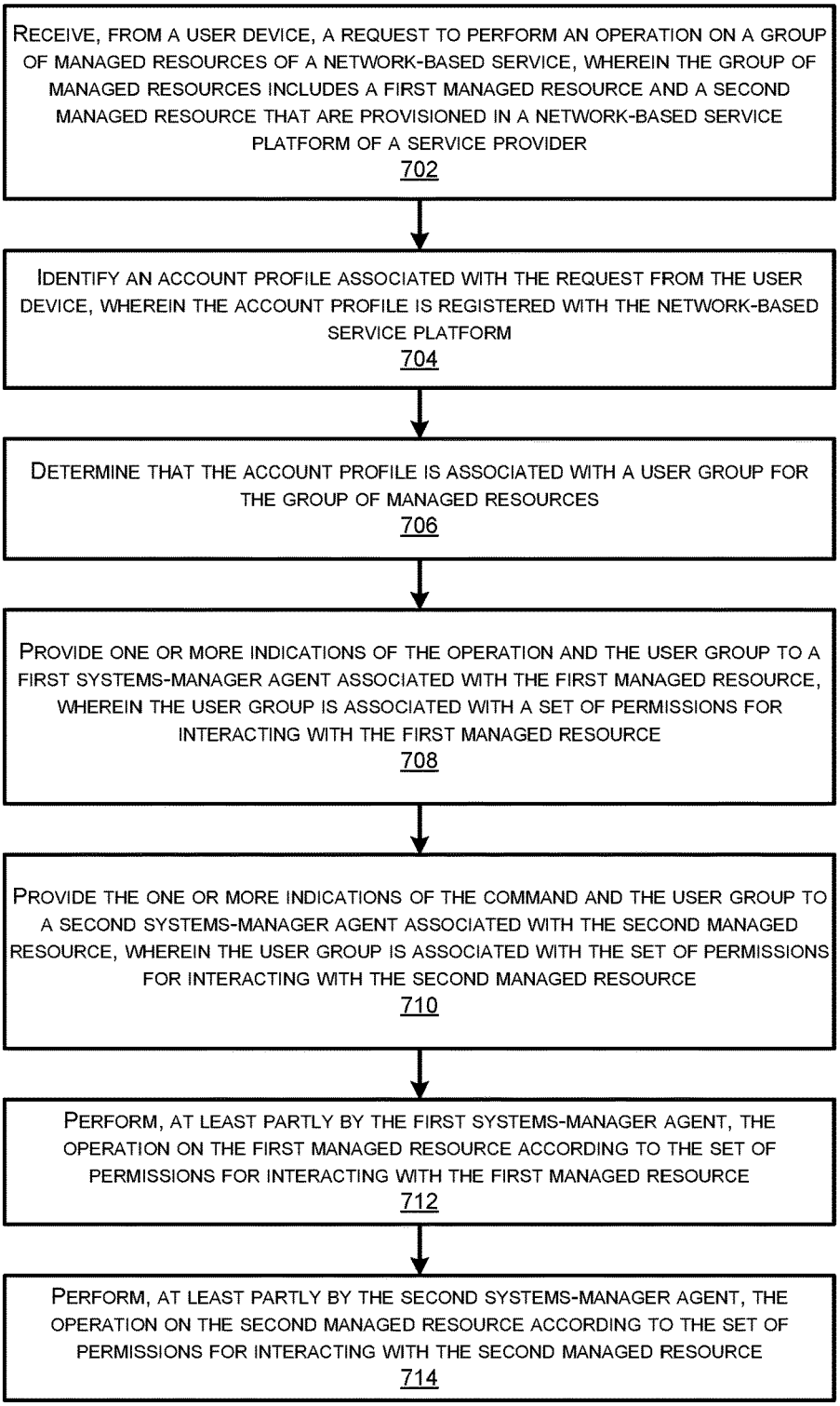
FIG. 7 illustrates a flow diagram of another example method for controlling the privileges and/or permissions of a user engaged in a remote user session for remotely managing a resource of a network-based service.

FIGS. 5-7 illustrate flow diagrams of example methods 500, 600, and 700 that illustrate aspects of the functions performed at least partly by the network-based service platform 102 as described in FIGS. 1-3. The logical operations described herein with respect to FIGS. 5, 6, and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5-7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method 500 for controlling the privileges and/or permissions of a user 132 (or administrator 112) engaged in a remote user session 202 for remotely managing a resource 106 of a network-based service provisioned in a network-services environment 104.

At 502, a network-based service platform 102 may receive, from a user device 134 and via an identity and access management (IAM) component 110, sign-in credentials 204 to remotely sign-in via the IAM component 110.

At 504, the network-based service platform 102 may determine a cloud identity (e.g., user identity 128) associated with the sign-in credentials 204 received from the user device 134. In some examples, the cloud identity is associated with a network-based service that includes multiple managed resources 106 deployed in the network-based service platform 102 (e.g., the network-services environment 104).

At 506, the network-based service platform 102 may receive, from the user device 134, a request to establish a remote user session 202 to remotely manage a managed resource 106 of the multiple managed resources 106(N).

At 508, the network-based service platform 102 may determine that the cloud identity is mapped (e.g., mapping 400) to a user group 154 of an operating system 148 on the managed resource 106, wherein the user group 154 is defined in local memory associated with the managed resource 106.

At 510, the network-based service platform 102 and/or the agent 150 may identify a first set of permissions according to which users in the user group 154 are permitted to execute commands via the operating system 148 of the managed resource 106.

At 512, the network-based service platform 102 may launch, at least partly by the systems-manager agent 150 operating on the managed resource 106, a shell (e.g., at the low-level privileges 156) on the managed resource 106 to interact with the operating system 148 according to the first set of permissions. In some examples, the systems-manager agent 150 interacts with the operating system 148 according to a second set of permissions (e.g., high-level privileges 152) that is less restrictive than the first set of permissions.

In some examples, network-based service platform 102 may, at least partly by the agent 150, create (or determine) a local user name for the operating system 148 of the managed resource 106. Further, the network-based service platform 102 may, at least partly by the agent 150, reset a password for the local user name to a new password. Even further, the network-based service platform 102 may, at least partly by the agent 150, log into the shell using the local user name and the new password.

At 514, the network-based service platform 102 may establish the remote user session 202 between the user device 134 and the managed resource 106 such that the user device 134 provides commands to the operating system 148 via the shell (e.g., a shell at the low-level privileges 156, high-level privileges 152, etc.).

At 516, the network-based service platform 102 may receive, from the user device 134 and via the shell and during the remote user session 202, a command for the operating system 148 to execute. In some examples, the command may be permitted by the first set of permissions (e.g., low-level privileges 156) associated with the shell that was determined using the local user group 154.

At 518, the network-based service platform 102 may execute, at least partly by the operating system 148, the command on the managed resource 106 (e.g., perform operation 158).

In some examples, the user device may correspond to the user device 134, and the operations of method 500 may further comprise receiving input (e.g., policy data 118) from a second user device (e.g., admin device 114) associated with an administrator 112 cloud identity (e.g., admin identity 124) of the network-based service. The network-based service platform 102 may generate a policy (e.g., user policy 130) based at least in part on the input provided from the administrator cloud identity. In some examples, the policy 130 specifies a name 206 of the managed resource 106, and a name 208 of the user group 154 that is defined in the local memory of the managed resource 106. Further, the network-based service platform 102 may map (e.g., mapping 400) the policy 130 to the cloud identity 128.

Although the techniques of method 500 are described with respect to a user 132, user device 134, user identity 128, and user policy 130, the techniques are equally applicable to the admin-based elements 112, 114,120, 124, 126, etc.

FIG. 6 illustrates a flow diagram of an example method 600 for controlling the privileges and/or permissions of a user 132 requesting a batch-management operation for remotely managing multiple resources 106 of a network-based service.

At 602, the network-based service platform 102 may receive, at one or more network-based devices associated with a service provider and from a user device 132, a request 136 to manage a managed resource of a network-based service. In some examples, the managed resource 106 is provisioned in a network-based service platform 102 (e.g., network-services environment 104) of the service provider.

At 604, the network-based service platform 102 may identify an account profile (e.g., user identity 128, admin identity 124, etc.) associated with a user 132 of the user device 134. In some examples, the account profile 128 is registered with the network-based service platform 102 (e.g., registered via the IAM component 110).

At 606, the network-based service platform 102 may determine, based at least in part on the account profile 128, a first set of permissions that define operations that the account profile 128 is permitted to perform on the managed resource 106. In some examples, the operations include executing a command, executing a plug-in, or any other type of operation that can be performed for managing the managed resource 106.

At 608, the network-based service platform 102 may establish a remote user session 202 between the user device 134 and the managed resource 106 such that the user device 134 is able to perform operations on the managed resource 106 via the remote user session, and according to the first set of permissions.

At 610, the network-based service platform 102 may receive an indication of an operation (e.g., a command) to be performed at least partly by the operating system and according to the first set of permissions.

In some examples, the network-based service platform 102 may launch, at least partly by a systems-manager agent 150 operating on the managed resource 106, a shell on the managed resource 106 to interact with an operating system 148 of the managed resource 106. In some examples, the shell is associated with a user account of the operating system 148 that interacts with the operating system 148 according to the first set of permissions (e.g., low-level privileges 156.

In such examples, prior to launching the shell, the network-based service platform 102 may identify an account policy 130 for the account profile 128 associated with the user 132 of the user device 134 that is registered with the network-based service platform 102. The policy 130 may include a first identifier (e.g., resource name 206) for the managed resource 106, and a second identifier (e.g., group name 208) for a user group 154 that is defined in memory associated with the managed resource 106. The user group 154 may be associated with the first set of permissions. Further, the network-based service platform 102 may, based at least in part on the account policy 130, instruct the systems-manager agent 150 to launch the shell on the managed resource 106 according to the first set of permissions (e.g., low-level privileges 156) associated with the user group 154. The operation, or command, may be executed in the shell if permitted by the first set of privileges, or refrained from being executed if not permitted.

In some examples, the network-based service platform 102 may receive, from the user device 134 and via the shell during the remote user session 202, an operation 210 for the operating system 148 to perform or execute. In some examples, the network-based service platform 102 may refrain from performing the operation 210 based at least in part on the operation 210 being restricted by the first set of permissions.

In some examples, the user device comprises a first user device 134. The network-based service platform 102 may receive input (e.g., policy data 118) from a second user device 114 associated with an administrator account profile 124 of the network-based service. Further, the network-based service platform 102 may generate the account policy 130 based at least in part on the input 118 provided from the administrator profile 124. Even further, the network-based service platform 102 may associate (e.g., map) the account policy 126 with the account profile 124 of the user 132.

FIG. 7 illustrates a flow diagram of another example method 700 for controlling the privileges and/or permissions of a user 132 engaged in a remote user session 136 for remotely managing a resource 106 of a network-based service.

At 702, the network-based service platform 102 may receive, from a user device 134, a request 136 to perform an operation on a group of managed resources 106 of a network-based service. In some examples, the group of managed resources 106 includes a first managed resource 106(1) and a second managed resource 106(2) that are each provisioned in a network-based service platform 102 of a service provider.

In some examples, the network-based service platform 102 may perform operations for identifying the group of managed resources. For example, the network-based service platform 102 may identify a set of managed resources associated with the account profile. Further, the network-based service platform 102 may identify, from the set of managed resources, the group of managed resources based at least in part on each managed resource in the group having a common characteristic. As an example, the network-based service platform 102 may execute a query to identify managed resources that share a common characteristic or property, such as having a same operating installed thereon, being a same type of managed resource, etc.

At 704, the network-based service platform 102 may identify an account profile 128 associated with the request 136 from the user device 134. The account profile 128 may be registered with the network-based service platform 102.

At 706, the network-based service platform 102 may determine that the account profile 128 is associated with a user group 154 for operating systems 148 installed on the group of managed resources 106.

At 708, the network-based service platform 102 may provide one or more indications (e.g., group name 304, command/document 308(1)) of the operation and the user group to a first systems-manager agent 150(1) associated with the first managed resource 106(1). The user group 154(1) may be defined local to the first managed resource 106(1) as being associated with a set of permissions for interacting with a first operating system 148(1) of the first managed resource 106(1).

At 710, the network-based service platform 102 may provide the one or more indications (e.g., group name 304, command/document 308(2)) of the operation and the user group to a second systems-manager agent 150(2) associated with the second managed resource 106(2). The user group 154(2) may be defined local to the second managed resource 106(2) as being associated with the set of permissions for interacting with a second operating system 148(2) of the second managed resource 106(2). When providing the one or more indications, the network-based service platform 102 may publish a single indication for all of the agents 150 to identify, or an indication may be sent to each of the agents 150.

At 712, the network-based service platform 102 may perform (e.g., execute), at least partly by the first systems-manager agent 150(1), the operation (e.g., perform operation 158(1)) on the first managed resource 106(1) according to the set of permissions for interacting with the first operating system 148(1).

At 714, the network-based service platform 102 may perform, at least partly by the second systems-manager agent 150(2), the operation (e.g., perform operation 158(2)) on the second managed resource 106(2) according to the set of permissions for interacting with the second operating system 148(2).

In some examples, the network-based service platform 102 may utilize the account profiles of users to track, or monitor, which account profiles performed operations on managed resources. For example, the network-based service platform 102 may track operations performed on the first managed resource, or for each of the managed resources, that are performed/requested by users associated with one or more account profiles. Further, the network-based service platform 102 may store one or more records in a database associated with the network-based service platform 102. The one or more records may indicate associations between the operations performed and the one or more account profiles that performed the operations. In this way, the network-based service platform 102 may store "cloud trails" to identify which operations were performed by which account profiles, which may be utilized for auditing purposes.

In various examples, the method 700 further comprises launching, at least partly by the first systems-manager agent 150(1), a first shell on the first managed resource 106(1) to interact with the first operating system 148(1) according to the set of permissions (e.g., low-level privileges 156). Further, the method 700 may further comprise launching, at least partly by the second systems-manager agent 150(2), a second shell on the second managed resource 106(2) to interact with the second operating system 148(2) according to the set of permissions (e.g., low-level privileges 156). In such examples, the command may be executed on the first managed resource 106(1) at least partly using the first shell, and the command is executed on the second managed resource 106(2) at least partly using the second shell.

In some examples, the method 700 further comprises identifying an account policy for the account profile associated with the request that is registered with the network-based service platform, wherein the account policy includes: a first identifier for the group of managed resources; and a second identifier for the user group.

In some examples, the user device comprises a first user device, and the method 700 further comprises receiving input from a second user device associated with an administrator account profile of the network-based service platform, generating the account policy based at least in part on the input provided from the administrator profile and associating the account policy with the account profile.

In some examples, the method 700 further comprises receiving, via an identity and access management (IAM) component associated with the service provider, sign-in credentials from the user device. In such examples, the identifying the account profile associated with the request from the user device is based at least in part on the sign-in credentials for the IAM component.

In various examples, the method 700 further comprises determining a change on the first managed resource that resulted from the executing the command on the first managed resource, and storing an association between the account profile and the change on the first managed resource that resulted from executing the command that was requested by the user device associated with the account profile. For example, the network-based service platform 102 may store changes may by the different identities 124 and/or 128 to track what users 132 and/or admins 112 are making changes to the managed resources 106.

Figure 8:
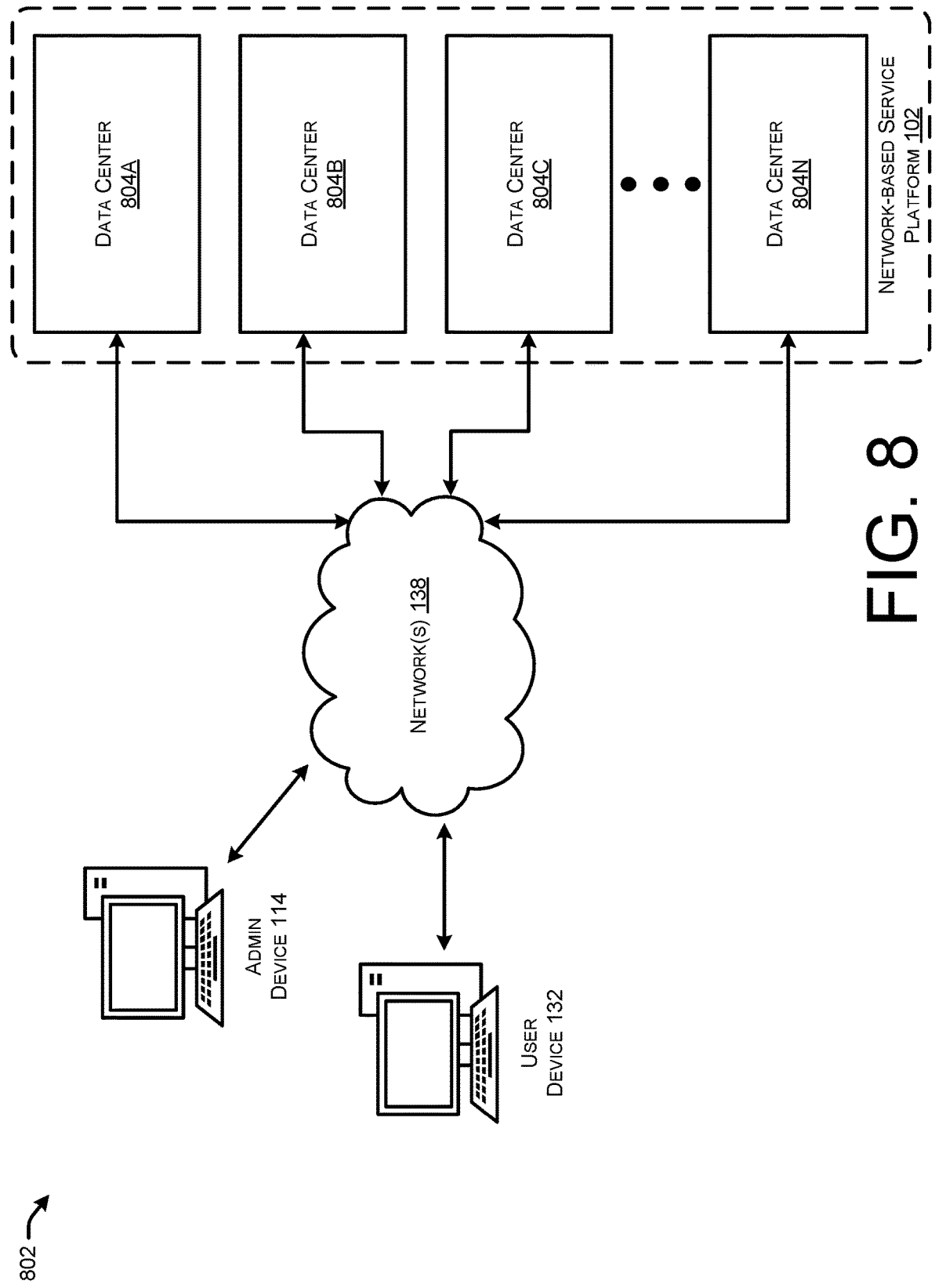
FIG. 8 is a system and network diagram that shows an illustrative operating environment that includes a service provider network that can be configured to implement aspects of the functionality described herein.

FIG. 8 is a system and network diagram that shows one illustrative operating environment 802 for the configurations disclosed herein that includes a network-based service platform 102 that can be configured to perform the techniques disclosed herein. The network-based service platform 102 can provide computing resources, like VM instances and storage, on a permanent or an as-needed basis. Among other types of functionality, the computing resources provided by the network-based service platform 102 may be utilized to implement the various services described above. As also discussed above, the computing resources provided by the network-based service platform 102 can include various types of computing resources, such as data processing resources like VM instances, data storage resources, networking resources, data communication resources, network services, and the like.

Each type of computing resource provided by the network-based service platform 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The network-based service platform 102 can also be configured to provide other types of computing resources not mentioned specifically herein.

The computing resources provided by the network-based service platform 102 may be enabled in one embodiment by one or more data centers 804A-804N (which might be referred to herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 can also be located in geographically disparate locations. One illustrative embodiment for a data center 804 that can be utilized to implement the technologies disclosed herein will be described below with regard to FIG. 8.

The customers and other users of the network-based service platform 102 may access the computing resources provided by the network-based service platform 102 over any wired and/or wireless network(s) 138, which can be a wide area communication network ("WAN"), such as the Internet, an intranet or an Internet service provider ("ISP") network or a combination of such networks. For example, and without limitation, a user device 132 operated by a customer or other user of the network-based service platform 102 may be utilized to access the network-based service platform 102 by way of the network(s) 138. It should be appreciated that a local-area network ("LAN"), the Internet, or any other networking topology known in the art that connects the data centers 804 to remote customers and other users can be utilized. It should also be appreciated that combinations of such networks can also be utilized.

Figure 9:
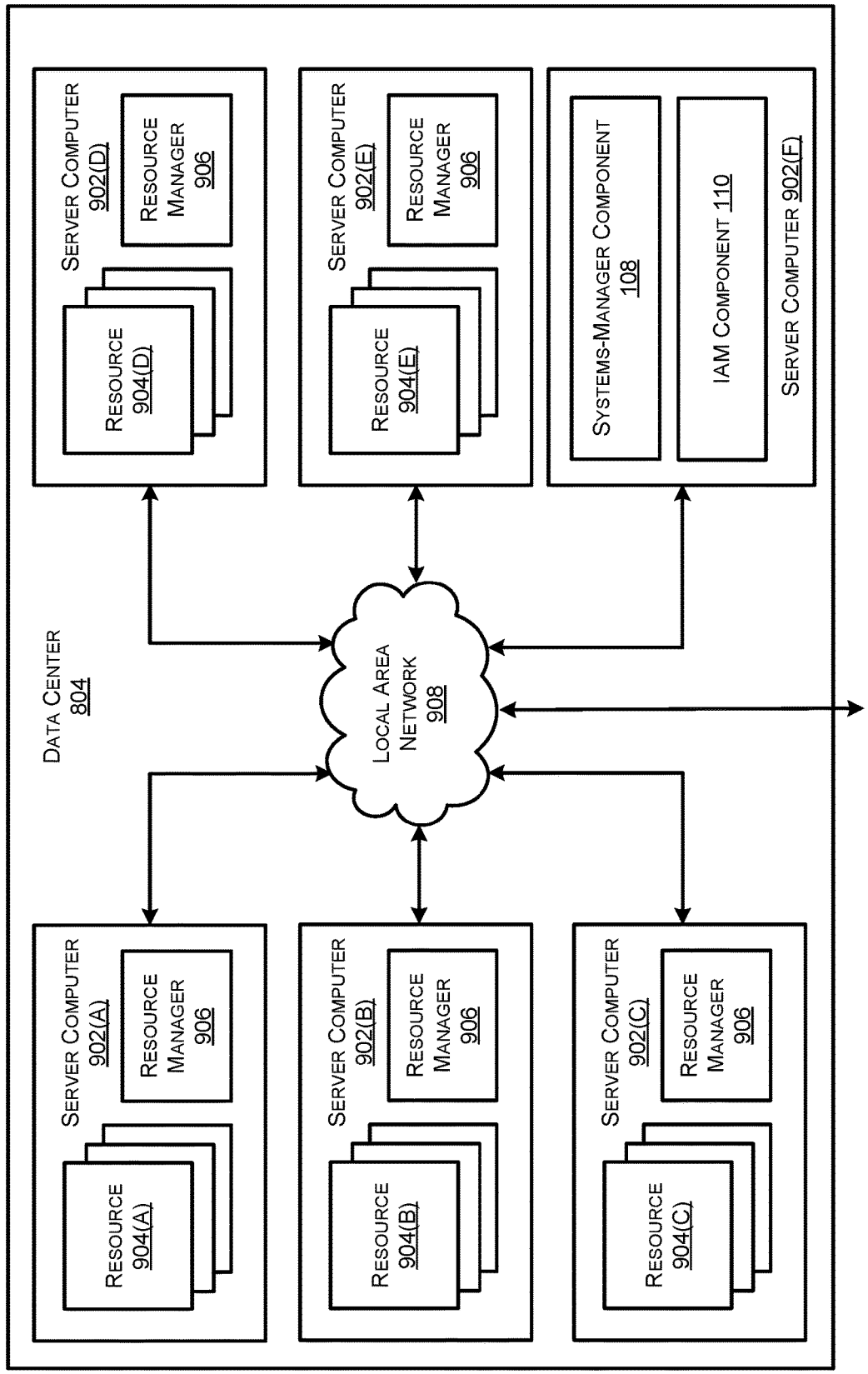
FIG. 9 is a computing system diagram illustrating a configuration for a data center that can be utilized to implement aspects of the technologies disclosed herein.

FIG. 9 is a computing system diagram that illustrates one configuration for a data center 804 that implements aspects of the technologies disclosed herein. The example data center 804 shown in FIG. 9 includes several server computers 902A-902F (which might be referred to herein singularly as "a server computer 902" or in the plural as "the server computers 902") for providing computing resources 904A-904E. In some examples, the resources 904 may include, or correspond to, the managed resources 106 described herein (e.g., virtual machines executing on the server computers 902).

The server computers 902 can be standard tower, rack-mount, or blade server computers configured appropriately for providing the computing resources described herein (illustrated in FIG. 9 as the computing resources 904A-904E). As mentioned above, the computing resources provided by the network-based service platform 102 can be data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. In some examples, the resource managers 906 may comprise the systems-management agents 150 and perform the techniques described herein as being performed by the agents 150. Server computers 902 in the data center 804 can also be configured to provide network services and other types of services, some of which are described in detail below with regard to FIG. 9.

The data center 804 shown in FIG. 9 also includes a server computer 902F that can execute some or all of the software components described above. For example, and without limitation, the server computer 902F can be configured to execute components of the network-based service platform 102, including the systems-manager component 108, the IAM component 110, and/or the other software components described above. The server computer 902F can also be configured to execute other components and/or to store data for providing some or all of the functionality described herein. In this regard, it should be appreciated that the services illustrated in FIG. 9 as executing on the server computer 902F can execute on many other physical or virtual servers in the data centers 904 in various embodiments.

In the example data center 804 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804A-804N, between each of the server computers 902A-902F in each data center 804, and, potentially, between computing resources in each of the server computers 902. It should be appreciated that the configuration of the data center 804 described with reference to FIG. 9 is merely illustrative and that other implementations can be utilized.

Figure 10:
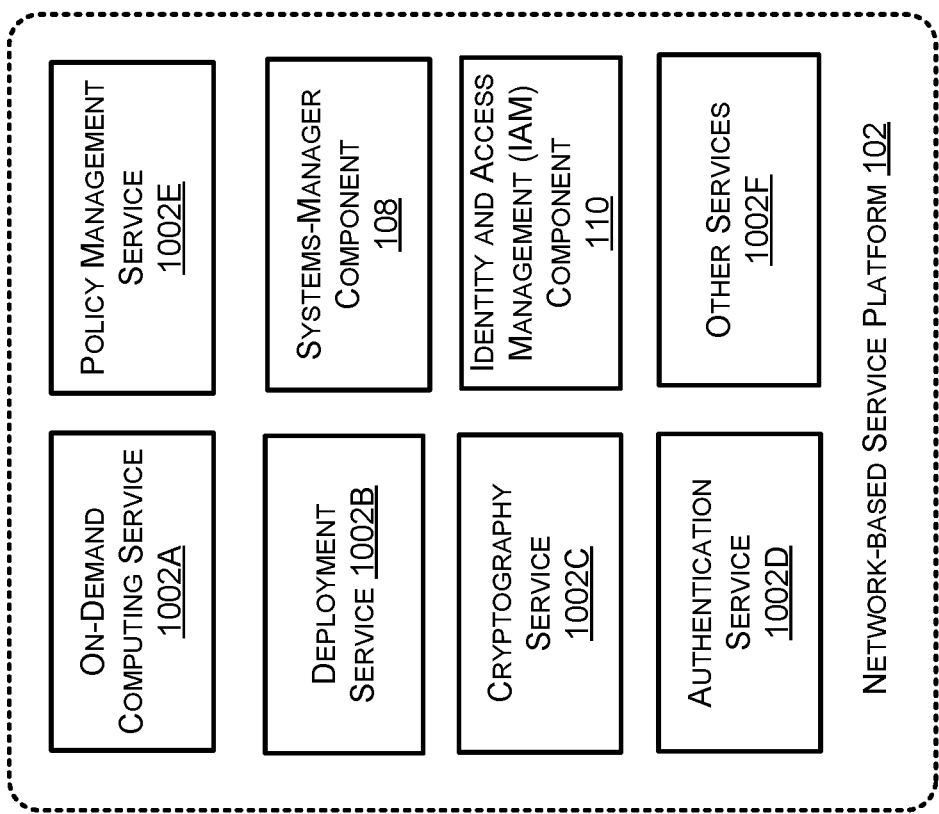
FIG. 10 is a system and network diagram that shows aspects of several services that can be provided by and utilized within a service provider network in one configuration disclosed herein.

FIG. 10 is a system and network diagram that shows aspects of several network services that can be provided by and utilized within a network-based service platform 102 in one embodiment disclosed herein. In particular, and as discussed above, the network-based service platform 102 can provide a variety of network services to customers and other users of the network-based service platform 102 including, but not limited to, the systems-manager component 108 and the IAM component 110. The network-based service platform 102 can also provide other types of services including, but not limited to, an on-demand computing service 1002A, a deployment service 1002B, a cryptography service 1002C, an authentication service 1002D, and/or a policy management service 1002E, some of which are described in greater detail below. Additionally, the network-based service platform 102 can also provide other services 1002F, some of which are also described in greater detail below.

It should be appreciated that customers of the network-based service platform 102 can include organizations or individuals that utilize some or all of the services provided by the network-based service platform 102. As described herein, a customer or other user can communicate with the network-based service platform 102 through a network, such as the network 138 shown in FIG. 8. Communications from a customer computing device, such as the computing devices 114 and 132 shown in FIG. 8, to the network-based service platform 102 can cause the services provided by the network-based service platform 102 to operate in accordance with the described configurations or variations thereof.

It is noted that not all embodiments described include the services described with reference to FIG. 10 and that additional services can be provided in addition to or as an alternative to services explicitly described. Each of the services shown in FIG. 10 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 1002A to store data in or retrieve data from a storage service). Additional details regarding some of the services shown in FIG. 10 will now be provided.

As discussed above, the on-demand computing service 1002A can be a collection of computing resources configured to instantiate VM instances and to provide other types of computing resources on demand. For example, a customer or other user of the network-based service platform 102 can interact with the on-demand computing service 1002A (via appropriately configured and authenticated network services API calls) to provision and operate VM instances that are instantiated on physical computing devices hosted and operated by the network-based service platform 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 1002A is shown in FIG. 10, any other computer system or computer system service can be utilized in the network-based service platform 102, such as a computer system or computer system service that does not employ virtualization and instead provisions computing resources on dedicated or shared computers/servers and/or other physical devices.

A storage service (e.g., other services 1002F) can include software and computing resources that collectively operate to store data using block or file-level storage devices (and/or virtualizations thereof). The storage devices of the storage service 1002F can, for instance, be operationally attached to virtual computer systems provided by the on-demand computing service 1002A to serve as logical units (e.g., virtual drives) for the computer systems. A storage device can also enable the persistent storage of data used/generated by a corresponding virtual computer system where the virtual computer system service might only provide ephemeral data storage.

The network-based service platform 102 can also include a cryptography service 1002C. The cryptography service 1002C can utilize storage services of the network-based service platform 102, such as the storage service 102F, to store encryption keys in encrypted form, whereby the keys are usable to decrypt customer keys accessible only to particular devices of the cryptography service 1002C. The cryptography service 1002C can also provide other types of functionality not specifically mentioned herein.

As illustrated in FIG. 10, the network-based service platform 102, in various embodiments, also includes an authentication service 1002D and a policy management service 1002E. The authentication service 1002D, in one example, is a computer system (i.e., collection of computing resources) configured to perform operations involved in authentication of users. For instance, one of the services 1002 shown in FIG. 10 can provide information from a user to the authentication service 1002D to receive information in return that indicates whether or not the requests submitted by the user are authentic. In some examples, the authentication service 1002D may include, correspond to, interact with, or otherwise be associated with the IAM component 110.

The policy management service 1002E, in one example, is a network service configured to manage policies (e.g., admin policies 126, user policies 130, etc.) on behalf of customers or internal users of the service provider network 102. The policy management service 1002E can include an interface that enables customers to submit requests related to the management of policy. Such requests can, for instance, be requests to add, delete, change or otherwise modify policy for a customer, service, or system, or for other administrative actions, such as providing an inventory of existing policies and the like. The policy management service 1002E may receive the policy data 118 from the admin device 114, and generate or determine the policies 126 and/or 130.

The network-based service platform 102 can additionally maintain other services 1002F based, at least in part, on the needs of its customers. For instance, the service provider network 102 can maintain a deployment service 1002B for deploying program code and/or a data warehouse service in some embodiments. Other services include object-level archival data storage services, database services, and services that manage, monitor, interact with, or support other services. The network-based service platform 102 can also be configured with other services not specifically mentioned herein in other embodiments.

Figure 11:
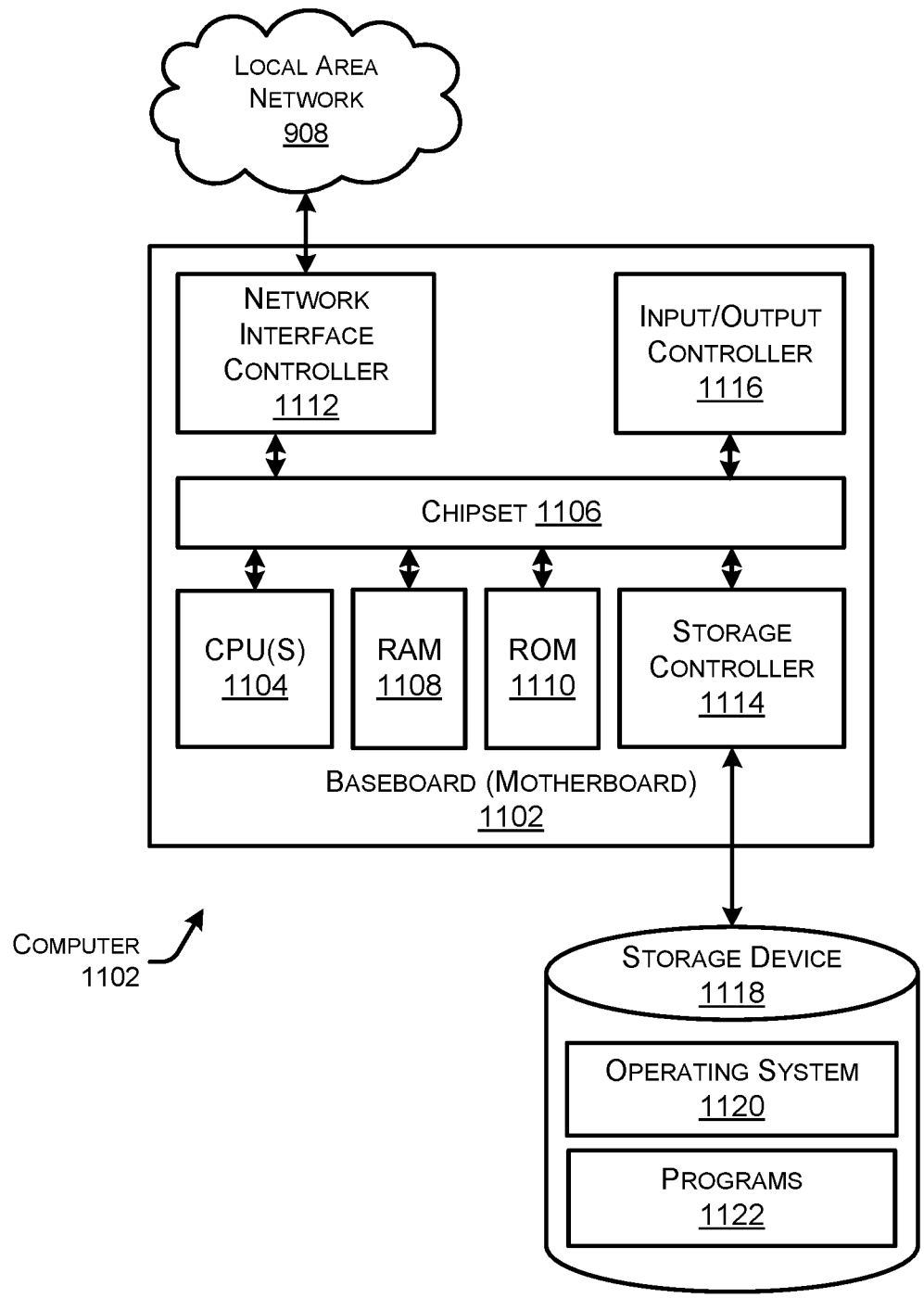
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 908. The chipset 1106 can include functionality for providing network connectivity through a NIC 1112, such as a gigabit Ethernet adapter. The NIC 1112 is capable of connecting the computer 1100 to other computing devices over the network 908 (or 138). It should be appreciated that multiple NICs 1112 can be present in the computer 1100, connecting the computer to other types of networks and remote computer systems.

The computer 1100 can be connected to a mass storage device 1118 that provides non-volatile storage for the computer. The mass storage device 1118 can store an operating system 1120 (e.g., operating systems 148(1)-(N)), programs 1122 (e.g., applications, agent 150, etc.), and data, which have been described in greater detail herein. The mass storage device 1118 can be connected to the computer 1100 through a storage controller 1114 connected to the chipset 1106. The mass storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1118 is characterized as primary or secondary storage, and the like.

For example, the computer 1100 can store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1118 by detecting the physical states or characteristics of one or more particular locations within the physical storage units.

In addition to the mass storage device 1118 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1118 can store an operating system 1120 utilized to control the operation of the computer 1100. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1118 can store other system or application programs and data utilized by the computer 1100.

In one embodiment, the mass storage device 1118 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes described above with regard to FIGS. 1-7. The computer 1100 can also include computer-readable storage media having instructions stored thereupon for performing any of the other computer-implemented operations described herein.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed by the one or more processors, cause the one or more processors to perform operations comprising:
receiving, from a user device and via an identity and access management (IAM) component of a network-based service platform, sign-in credentials to remotely sign-in to an account associated with the network-based service platform;
determining a cloud identity associated with the sign-in credentials received from the user device, wherein the cloud identity is associated with a network-based service that includes multiple managed instances deployed in the network-based service platform;
receiving, from the user device, a request to establish a remote user session to remotely manage a managed instance of the multiple managed instances;
determining that the cloud identity is mapped to a user group of an operating system of the managed instance, wherein the user group is defined in local memory associated with the managed instance;
identifying a first set of permissions for users in the user group, wherein the first set of permissions define commands the users are permitted to execute via the operating system of the managed instance;
launching, at least partly by a systems-manager agent operating on the managed instance, a shell on the managed instance to interact with the operating system according to the first set of permissions, wherein the systems-manager agent interacts with the operating system according to a second set of permissions that is less restrictive than the first set of permissions;
establishing the remote user session between the user device and the managed instance such that the user device provides commands to the operating system via the shell;
receiving, from the user device and via the shell during the remote user session, a command for the operating system to execute, wherein the command is permitted by the first set of permissions; and
executing, at least partly by the operating system, the command on the managed instance.

2. The system of claim 1, wherein the user device comprises a first user device, and the operations further comprising:
receiving input from a second user device associated with an administrator cloud identity of the network-based service;
generating a policy based at least in part on the input provided from the administrator cloud identity, wherein the policy specifies:
a name of the managed instance; and
a name of the user group that is defined in the local memory of the managed instance; and
mapping the policy to the cloud identity.

3. The system of claim 1, wherein the second set of permissions according to which the systems-manager agent interacts with the operating system correspond to at least one of:
first privileges of a root account for a Unix-based operating system; or
second privileges of an administrator account for a Windows-based operating system.

4. The system of claim 1, the operations further comprising:
creating, at least partly by the systems-manager agent, a local user name for the operating system of the managed instance;
resetting, at least partly by the systems-manager agent, a password for the local user name to a new password; and
logging into the shell, at least partly by the systems-manager agent, using the local user name and the new password.

5. A computer-implemented method comprising:
receiving, at one or more network-based devices associated with a service provider and from a user device, a request to manage a managed resource of a network-based service, wherein the managed resource is provisioned in a network-based service platform of the service provider;

identifying an account profile associated with a user of the user device, wherein the account profile is registered with the network-based service platform;

determining that the account profile is mapped to a user group defined in local memory associated with the managed resource, the user group being associated with a first set of permissions that define operations that the account profile is permitted to perform on the managed resource;

establishing a remote user session between the user device and the managed resource such that the user device is able to perform operations on the managed resource via the remote user session;

receiving, via the remote user session, an indication of an operation to be performed at least partly on the managed resource and according to the first set of permissions; and providing a systems-manager agent associated with the managed resource with one or more indications of the operation and the user group that is associated with the first set of permissions that define operations that the account profile is permitted to perform on the managed resource.

6. The computer-implemented method of claim 5, further comprising:

identifying an account policy for the account profile associated with the user of the user device that is registered with the network-based service platform, wherein the account policy includes:
   a first identifier for the managed resource; and
   a second identifier for the user group associated with the managed resource; and providing the systems-manager agent associated with the managed resource with an indication of the second identifier for the user group that is associated with the managed resource.

7. The computer-implemented method of claim 6, wherein the user device comprises a first user device, the method further comprising:

receiving input from a second user device associated with an administrator account profile of the network-based service;

generating the account policy based at least in part on the input provided from the administrator profile; and associating the account policy with the account profile of the user.

8. The computer-implemented method of claim 5, further comprising:

identifying an account policy for the account profile associated with the user of the user device that is registered with the network-based service platform, wherein the account policy includes:
   a first identifier for a grouping of managed resources, wherein the grouping of managed resources includes the managed resource; and
   a second identifier for the user group that is associated with the grouping of managed resources; and based at least in part on the account policy, instructing a systems-manager agent associated with the grouping of managed resources to launch a shell on the managed resource that interacts with the managed resource according to the first set of permissions.

9. The computer-implemented method of claim 8, wherein the managed resources are included in the grouping based at least in part on one or more of:
   each of the managed resources being associated with a same type of operating system; or
   each of the managed resources being a same type of resource.

10. The computer-implemented method of the claim 5, further comprising:
   receiving, via an identity and access management (IAM) component associated with the service provider, sign-in credentials from the user device,
   wherein the identifying the account profile associated with the user of the user device is based at least in part on the sign-in credentials for the IAM component.

11. The computer-implemented method of claim 5, further comprising:
   launching, at least partly by the systems-manager agent associated with the managed resource, a shell on the managed resource to interact with an operating system of the managed resource, wherein the shell is associated with a user account of the operating system that interacts with the operating system according to the first set of permissions;
   creating, at least partly by a systems-manager agent, a local user name for the operating system of the managed resource;
   resetting, at least partly by the systems-manager agent, a password for the local user name to a new password; and
   logging into the shell, at least partly by the systems-manager agent, using the local user name and the new password.

12. The computer-implemented method of claim 5, further comprising:
   launching, at least partly by the systems-manager agent associated with the managed resource, a shell on the managed resource to interact with an operating system of the managed resource,
   wherein:
      the shell is associated with a user account of the operating system that interacts with the operating system according to the first set of permissions, and
      the user device is able to perform the operation on the managed resource via the remote user session by executing a command via the shell.

13. The computer-implemented method of claim 5, further comprising:
   tracking operations performed on the managed resource that are performed via one or more account profiles; and
   storing a record in a database associated with the one or more network-based devices, wherein the record indicates associations between the operations performed and the one or more account profiles by which the operations were performed on the managed resource.

14. A system comprising:
one or more processors; and
one or more computer-readable media storing computer-executable instructions that, when executed by the one or more processors, cause the one or more processors to perform operations comprising:
   receiving, from a user device, a request to perform an operation on a group of managed resources of a network-based service, wherein the group of managed resources includes a first managed resource and a second managed resource that are each provisioned in a network-based service platform of a service provider;

identifying an account profile associated with the request from the user device, wherein the account profile is registered with the network-based service platform;

determining that the account profile is associated with a user group for the group of managed resources, the user group being defined in first local memory associated with the first managed resource and in second local memory associated with the second managed resource;

providing one or more indications of the operation and the user group to a first systems-manager agent executing on the first managed resource, wherein the user group is associated with a set of permissions for interacting with the first managed resource;

providing the one or more indications of the operation and the user group to a second systems-manager agent executing on the second managed resource, wherein the user group is associated with the set of permissions for interacting with the second managed resource;

performing, at least partly by the first systems-manager agent, the operation on the first managed resource according to the set of permissions for interacting with the first managed resource; and performing, at least partly by the second systems-manager agent, the operation on the second managed resource according to the set of permissions for interacting with the second managed resource.

15. The system of claim 14, the operations further comprising:

launching, at least partly by the first systems-manager agent, a first shell on the first managed resource to interact with a first operating system according to the set of permissions; and launching, at least partly by the second systems-manager agent, a second shell on the second managed resource to interact with a second operating system according to the set of permissions, wherein the operation comprises a command that is executed on the first managed resource at least partly using the first shell, and the command is executed on the second managed resource at least partly using the second shell.

16. The system of claim 15, the operations further comprising:

creating, at least partly by the first systems-manager agent, a local user name for a first operating system of the first managed resource;

resetting, at least partly by the first systems-manager agent, a password for the local user name to a new password; and logging into the first shell, at least partly by the first systems-manager agent, using the local user name and the new password.

17. The system of claim 14, wherein:

the set of permissions comprise a first set of permissions;

the first systems-manager agent interacts with a first operating system according to a second set of permissions; and the second set of permissions are less restrictive than the first set of permissions.

18. The system of claim 14, the operations further comprising identifying an account policy for the account profile associated with the request that is registered with the network-based service platform, wherein the account policy includes:

a first identifier for the group of managed resources; and a second identifier for the user group.

19. The system of claim 18, wherein the user device comprises a first user device, the operations further comprising:

receiving input from a second user device associated with an administrator account profile of the network-based service platform;

generating the account policy based at least in part on the input provided from the administrator profile; and associating the account policy with the account profile.

20. The system of claim 14, the operations further comprising:

receiving, via an identity and access management (IAM) component associated with the service provider, sign-in credentials from the user device, wherein the identifying the account profile associated with the request from the user device is based at least in part on the sign-in credentials for the IAM component.

21. The system of claim 14, the operations further comprising:

tracking operations performed on the first managed resource that are performed by users associated with one or more account profiles; and storing a record in a database associated with the system, wherein the record indicates associations between the operations performed and the one or more account profiles that performed the operations on the first managed resource.

22. The system of claim 14, the operations further comprising:

identifying a set of managed resources associated with the account profile;

identifying, from the set of managed resources, the group of managed resources based at least in part on each managed resource in the group having a common characteristic.

23. The system of claim 22, wherein identifying the group managed resources based at least in part on each managed resource in the group having the common characteristic comprises at least one of:

determining that each of the managed resources in the group is associated with a same operating system; or determining that each of the managed resources in the group are a same type of managed resource.

* * * * *